US012356481B2

(12) United States Patent
Geng et al.

(10) Patent No.: US 12,356,481 B2
(45) Date of Patent: Jul. 8, 2025

(54) COMMUNICATION METHOD AND COMMUNICATION APPARATUS FOR HANDLING FAILURES

(71) Applicant: HUAWEI TECHNOLOGIES CO., LTD., Guangdong (CN)

(72) Inventors: Tingting Geng, Shanghai (CN); Xiaoli Shi, Shanghai (CN); Le Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 425 days.

(21) Appl. No.: 17/512,759

(22) Filed: Oct. 28, 2021

(65) Prior Publication Data

US 2022/0053587 A1    Feb. 17, 2022

Related U.S. Application Data

(63) Continuation of application No. PCT/CN2020/087093, filed on Apr. 27, 2020.

(30) Foreign Application Priority Data

Apr. 29, 2019    (CN) .......................... 201910356792.9

(51) Int. Cl.
*H04W 76/18*    (2018.01)
*H04W 24/04*    (2009.01)
*H04W 36/00*    (2009.01)

(52) U.S. Cl.
CPC ........... *H04W 76/18* (2018.02); *H04W 24/04* (2013.01); *H04W 36/00698* (2023.05)

(58) Field of Classification Search
CPC ..... H04W 76/10; H04W 76/15; H04W 76/16; H04W 76/18; H04W 76/19; H04W 24/04;
(Continued)

(56) References Cited

U.S. PATENT DOCUMENTS

2020/0059395 A1* 2/2020 Chen ................... H04W 28/082
2020/0351968 A1* 11/2020 Yilmaz ............. H04W 36/0058
2022/0007257 A1* 1/2022 Wang ................. H04W 36/305

FOREIGN PATENT DOCUMENTS

CN    104219787 A    12/2014
CN    105101253 A    11/2015
(Continued)

OTHER PUBLICATIONS

Huawei, HiSilicon, "Fast MCG recovery via SCG," 3GPP TSG-RAN WG2 Meeting#105, R2-1901617, Athens, Greece, Feb. 25-Mar. 1, 2019, 2 pages.
(Continued)

*Primary Examiner* — Peter Chen
(74) *Attorney, Agent, or Firm* — Fish & Richardson P.C.

(57) ABSTRACT

The present disclosure provides example communication methods and communication apparatuses. One example communication method includes determining a failure report by a terminal device, where the failure report includes information about a cell in a secondary cell group (SCG) in which master cell group (MCG) connection recovery is attempted when the terminal device detects that a connection failure occurs in an MCG. The failure report is sent by the terminal device to a first access network device.

16 Claims, 15 Drawing Sheets

(58) Field of Classification Search
CPC ............ H04W 24/10; H04W 36/0055; H04W 36/0079; H04W 36/305; H04W 36/0058; H04W 36/0069
See application file for complete search history.

(56) References Cited

FOREIGN PATENT DOCUMENTS

| CN | 107690162 A | 2/2018 |
|---|---|---|
| WO | 2015116877 A1 | 8/2015 |
| WO | 2018028969 A1 | 2/2018 |
| WO | 2018174038 A1 | 9/2018 |
| WO | 2019051362 A1 | 3/2019 |

OTHER PUBLICATIONS

Huawei, HiSilicon, "UP integrity check failure handling in LTE-NR DC," 3GPP TSG-RAN WG2 Meeting #99bis, R2-1711094, Prague, Czech Republic, Oct. 9-13, 2017, 3 pages.

3GPP TS 36.331 V15.5.1 (Apr. 2019), "3rd Generation Partnership Project; Technical Specification Group Radio Access Network; Evolved Universal Terrestrial Radio Access (E-UTRA); Radio Resource Control (RRC); Protocol specification (Release 15)," Apr. 2019, 948 pages.

Office Action issued in Chinese Application No. 201910356792.9 on Mar. 3, 2021, 18 pages (with English translation).

Office Action issued in Chinese Application No. 201910356792.9 on Aug. 4, 2021, 6 pages (with English translation).

PCT International Search Report and Written Opinion issued in International Application No. PCT/CN2020/087093 on Jul. 2, 2020, 15 pages (with English translation).

Extended European Search Report issued in European Application No. 20798702.5 on Jun. 8, 2022, 12 pages.

Huawei, HiSilicon, "Discussion on MDT in MR-DC," 3GPP TSG-RAN WG2 Meeting #105bis, R2-1904823, Xi'an, China, Apr. 8-12, 2019, 4 pages.

Vivo, "Remaining issues on Fast recovery," 3GPP TSG-RAN WG2 Meeting #105bis, R2-1903342, Xi'an, China, Apr. 8-12, 2019, 4 pages.

ZTE Corporation, Sanechips, "Further consideration on MCG fast recovery," 3GPP TSG-RAN WG2 Meeting #105bis, R2-1904254, Xi'an, China, Apr. 8-12, 2019, 4 pages.

* cited by examiner

COMMUNICATION METHOD AND COMMUNICATION APPARATUS FOR HANDLING FAILURES

CROSS-REFERENCE TO RELATED APPLICATIONS

This application is a continuation of International Application No. PCT/CN2020/087093, filed on Apr. 27, 2020, which claims priority to Chinese Patent Application No. 201910356792.9, filed on Apr. 29, 2019. The disclosures of the aforementioned applications are hereby incorporated by reference in their entireties.

TECHNICAL FIELD

This application relates to the communication field, and more specifically, to a communication method and a communication apparatus.

BACKGROUND

A terminal device may have communication connections to at least two access network devices simultaneously and may send and receive data. The connection technology may be referred to as dual-connectivity (DC) or multi-connectivity. In the at least two access network devices, an access network device that is responsible for exchanging a radio resource control message with the terminal device and is responsible for interacting with a core network control plane entity may be referred to as a master node (MN), and another access network device may be referred to as a secondary node (SN). Because the terminal device may simultaneously receive services of a plurality of cells associated with one node, the master node MN may also be referred to as a master cell group (MCG). Similarly, the secondary base station SN may also be referred to as a secondary cell group (SCG).

In a DC architecture, the terminal device detects whether connection failures occur on links of the MCG and the SCG. If the terminal device detects that a connection failure occurs in the SCG, the terminal device still remains in connected mode, and the terminal device may report connection failure information of the SCG by using the MCG. If the terminal device detects that a connection failure occurs in the MCG, the terminal device may also indicate connection failure information of the MCG to the MCG by using the SCG, and attempt to recover the MCG, that is, the terminal device attempts to recover a connection between the terminal device and the MCG.

In a handover scenario, inappropriate configuration of a handover parameter may cause a connection failure. In a solution, the terminal device may record and report a parameter in a mobility failure process to a network device, so that the network device can better adjust a handover-related parameter. However, when handover is performed in the DC architecture, when the terminal device detects that the connection failure occurs in the MCG, how to report the parameter in the mobility failure process is a problem that needs to be urgently resolved.

SUMMARY

This application provides a communication method and a communication apparatus. A terminal device reports information about a cell in an SCG in which master cell group MCG connection recovery is attempted when the terminal device detects that a connection failure occurs in an MCG, to assist an access network device in configuring a mobility-related parameter.

The communication method in embodiments of this application may be applied to a handover scenario, for example, a scenario in which the terminal device is handed over from a source access network device to a target access network device. The terminal device is configured as DC in a source cell, and/or is configured as DC in a target cell. When detecting that a connection failure occurs in a master cell group MCG of the source cell or the target cell, the terminal device may recover the MCG by using a configured SCG.

In an example, an RLF or an HOF may occur on the terminal device in the MCG of the source cell or the target cell. This is not limited in the embodiments of this application.

According to a first aspect, a communication method is provided, and includes:

determining, by a terminal device, a failure report, where the failure report includes information about a cell in a secondary cell group SCG in which master cell group MCG connection recovery is attempted when the terminal device detects that a connection failure occurs in an MCG; and sending, by the terminal device, the failure report to a first access network device.

In this embodiment of this application, because the failure report includes the information about the cell in the SCG in which master cell group MCG connection recovery is attempted when the terminal device detects that the connection failure occurs in the MCG, the failure report can assist an access network device in determining a cell in which a connection failure occurs in a handover process, so that the access network device better adjusts a handover-related parameter, or the access network device is assisted in configuring a related parameter.

According to a second aspect, a communication method is provided, and includes:

receiving, by a first access network device, a failure report sent by a terminal device, where the failure report includes information about a cell in a secondary cell group SCG in which master cell group MCG connection recovery is attempted when the terminal device detects that a connection failure occurs in an MCG; and determining, by the first access network device based on the failure report, a cell in which the connection failure occurs.

In this embodiment of this application, because the failure report includes the information about the cell in the SCG in which master cell group MCG connection recovery is attempted when the terminal device detects that the connection failure occurs in the MCG, the failure report can assist an access network device in determining a cell in which a connection failure occurs in a handover process, so that the access network device better adjusts a handover-related parameter, or the access network device is assisted in configuring a related parameter.

In a possible implementation, when an access network device to which the cell in which the connection failure occurs belongs is the first access network device, the first access network device may adjust the handover-related parameter based on the failure report.

With reference to the second aspect, in some implementations of the second aspect, the method further includes:

sending, by the first access network device, a failure indication to a second access network device to which the cell in which the connection failure occurs belongs, where the failure indication includes the failure report.

In other words, when an access network device to which the cell in which the connection failure occurs belongs is the second access network device (namely, an access network device different from the first access network device), the first access network device may send the failure indication to the second access network device, where the failure indication includes the failure report, so that the second access network device can better adjust the handover-related parameter or the access network device can be assisted in configuring a related parameter.

According to a third aspect, a communication method is provided, and includes:

receiving, by a second access network device, a failure indication sent by a first access network device, where the failure indication includes a failure report, and the failure report includes information about a cell in a secondary cell group SCG in which master cell group MCG connection recovery is attempted when a terminal device detects that a connection failure occurs in an MCG; and determining, by the second access network device based on the failure report, an access network device that causes the connection failure.

In this embodiment of this application, because the failure report includes the information about the cell in the SCG in which master cell group MCG connection recovery is attempted when the terminal device detects that the connection failure occurs in the MCG, the failure report can assist an access network device in determining a cell in which a connection failure occurs in a handover process, so that the access network device better adjusts a handover-related parameter, or the access network device is assisted in configuring a related parameter.

In a possible implementation, when the second access network device determines, according to the failure indication, that the access network device that causes the connection failure is the second access network device, the second access network device may adjust the handover-related parameter based on the failure report.

With reference to the third aspect, in some implementations of the third aspect, the method further includes:

sending, by the second access network device, a first report to the third access network device that causes the connection failure, where the first report includes the failure report.

In other words, when the second access network device determines that the access network device that causes the connection failure is another access network device (for example, the third access network device), the second access network device may send the first report to the third access network device, where the first report includes the failure report, so that the third access network device can adjust the handover-related parameter based on the failure report.

According to a fourth aspect, a communication method is provided, and includes:

receiving, by a third access network device, a first report sent by a second access network device, where the first report includes a failure report, and the failure report includes information about a cell in a secondary cell group SCG in which master cell group MCG connection recovery is attempted when a terminal device detects that a connection failure occurs in an MCG; and adjusting, by the third access network device, a handover-related parameter based on the failure report.

In this embodiment of this application, because the failure report includes the information about the cell in the SCG in which master cell group MCG connection recovery is attempted when the terminal device detects that the connection failure occurs in the MCG, the failure report can assist an access network device in determining a cell in which a connection failure occurs in a handover process, so that the access network device better adjusts a handover-related parameter, or the access network device is assisted in configuring a related parameter.

With reference to the first aspect, the second aspect, the third aspect, or the fourth aspect, in some implementations of the first aspect, the second aspect, the third aspect, or the fourth aspect, the SCG is an SCG in which a connection failure occurs, and the connection failure is detected by the terminal device after detecting that the connection failure occurs in the master cell group MCG.

The SCG in which the connection failure detected by the terminal device occurs may mean that the terminal device cannot perform MCG fast recovery in the SCG, or that the terminal device performs MCG fast recovery in the SCG, but cannot receive a response message (for example, an RRC reconfiguration message) sent by the SCG. For example, after an RLF occurs on the terminal device in the MCG, the terminal device fails to perform MCG fast recovery in the SCG, that is, an RLF occurs on the terminal device in the SCG again.

Alternatively, the SCG is an SCG in which master cell group MCG connection recovery is successfully performed after the terminal device detects that the connection failure occurs in the MCG. In an example, in this case, the SCG may be denoted as last previousCellId.

Successfully performing MCG connection recovery may mean that the terminal device can receive a response message sent by the SCG. In an example, after an RLF occurs on the terminal device in the MCG, the terminal device successfully performs MCG fast recovery in the SCG. In this case, the terminal device may perform data and/or signaling transmission with the MCG by using the SCG.

Optionally, in this embodiment of this application, the connection failure that occurs in the MCG and that is detected by the terminal device may be referred to as the first connection failure, and the MCG is referred to as a cell in which a connection fails for the first time.

With reference to the first aspect, the second aspect, the third aspect, or the fourth aspect, in some implementations of the first aspect, the second aspect, the third aspect, or the fourth aspect, the failure report further includes at least one of the following information:

information about a cell in the MCG;

a type of the connection failure occurring in the MCG; and information about a cell to which the terminal device attempts to connect after the connection failure occurs in the MCG.

In this embodiment of this application, because the failure report includes the information about the cell in the master cell group MCG in which the connection failure occurs and the type of the connection failure occurring in the MCG, the failure report can assist the access network device in determining a type of a connection failure occurring on the terminal device in the MCG in the handover process, so that the access network device better adjusts the handover-related parameter, or the access network device is assisted in configuring the related parameter.

Optionally, before the first connection failure, the terminal device may receive a handover command.

Optionally, after the connection failure occurs on the terminal device in the MCG, MCG connection recovery fails to be performed in the SCG. The connection failure occurring in the SCG may be referred to as one more connection failure, and the SCG is referred to as a cell in which a connection fails again.

Optionally, after the connection failure occurs on the terminal device in the MCG, the MCG is successfully recovered in the SCG. In this case, the terminal device may receive a handover command message/a reconfiguration message by using the SCG. That is, after the connection failure occurs on the terminal device in the MCG, the terminal device receives the handover command message/the reconfiguration message. Optionally, when performing handover or reconfiguration based on the handover command message/the reconfiguration message, the terminal device may detect again that a connection failure occurs.

With reference to the first aspect, the second aspect, the third aspect, or the fourth aspect, in some implementations of the first aspect, the second aspect, the third aspect, or the fourth aspect, the failure report further includes at least one of the following information:

information about a cell in which the terminal device receives a handover command before the connection failure occurs in the MCG; and information about a cell in which a connection failure occurs, where the connection failure is detected by the terminal device again after the connection failure occurs in the MCG.

In this embodiment of this application, because the failure report includes the cell in which the terminal device receives the handover command before the terminal device detects that the connection failure occurs in the master cell group MCG, or the cell in which the connection failure occurs, where the connection failure is detected by the terminal device again after the terminal device detects that the connection failure occurs in the MCG, the failure report can assist the access network device in determining information about a cell before the first connection failure or information about the cell in which a connection failure occurs for the second time in a handover process, so that the access network device better adjusts the handover-related parameter, or the access network device is assisted in configuring the related parameter.

With reference to the first aspect, the second aspect, the third aspect, or the fourth aspect, in some implementations of the first aspect, the second aspect, the third aspect, or the fourth aspect, the failure report further includes at least one of the following information:

time since receiving the handover command before the connection failure occurs in the MCG to a time point at which the connection failure occurs in the MCG;

time since the connection failure occurs in the MCG to a time point at which the terminal device detects, after the connection failure occurs in the MCG, that the connection failure occurs again:

time since the connection failure occurs in the MCG to a time point at which the terminal device receives a handover command message after the connection failure occurs in the MCG;

time since the terminal device receives the handover command message after the connection failure occurs in the MCG to the time point at which the terminal device detects one more connection failure after the connection failure occurs in the MCG;

time since the terminal device detects one more connection failure after the connection failure occurs in the MCG; and time since the terminal device receives the handover command message after the connection failure occurs on the terminal device in the MCG.

In this embodiment of this application, because the failure report includes each piece of time information in a connection failure process, the failure report can assist the access network device in determining, based on the time information in the connection failure process, the cell in which the connection failure occurs, so that the access network device better adjusts a handover-related parameter, or the access network device is assisted in configuring a related parameter.

It should be noted that the time since the terminal device detects the one more connection failure is time since the terminal device detects the one more connection failure to a time point at which the terminal device sends the failure report, and the time since the terminal device receives the handover command message is time since the terminal device receives the handover command message to the time point at which the terminal device sends the failure report.

With reference to the first aspect, the second aspect, the third aspect, or the fourth aspect, in some implementations of the first aspect, the second aspect, the third aspect, or the fourth aspect, the failure report further includes:

a type of the connection failure that occurs again and that is detected by the terminal device after the connection failure occurs in the MCG.

In this embodiment of this application, because the failure report includes the type of the one more connection failure, the failure report can assist the access network device in determining the type of the connection failure that occurs again, so that the access network device better adjusts a handover-related parameter, or the access network device is assisted in configuring a related parameter.

According to a fifth aspect, a wireless communication apparatus is provided. The apparatus may be a terminal device, or may be a chip that may be used for the terminal device. The apparatus has a function of implementing the terminal device in the first aspect and the possible implementations. The function may be implemented by hardware, or may be implemented by hardware executing corresponding software. The hardware or the software includes one or more modules corresponding to the function.

In a possible design, the apparatus includes a transceiver module. Optionally, the apparatus further includes a processing module. The transceiver module may be, for example, at least one of a transceiver, a receiver, and a transmitter. Optionally, the transceiver module may include a radio frequency circuit or an antenna. The processing module may be a processor. Optionally, the apparatus further includes a storage module. The storage module may be, for example, a memory. When the storage module is included, the storage module is configured to store instructions or data. In a possible manner, the processing module is connected to the storage module. The processing module may execute the instructions stored in the storage module or instructions from another module, so that the apparatus performs the communication method according to the first aspect and the possible implementations.

In another possible design, when the apparatus is the chip, the chip includes a transceiver module. Optionally, the apparatus further includes a processing module. The transceiver module may be, for example, an input/output interface, a pin, or a circuit on the chip. The processing module may be, for example, a processor. Optionally, the processing module enables the chip to implement the method according to any one of the first aspect and the possible implementations. Optionally, the processing module may execute instructions in a storage module or invoke information such as data in the storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the first aspect and the possible implementations.

According to a sixth aspect, a wireless communication apparatus is provided. The apparatus may be an access network device, or may be a chip that may be used for the access network device. The apparatus has a function of implementing the access network device in the second aspect, the third aspect, or the fourth aspect, and various possible implementations. The function may be implemented by hardware, or may be implemented by hardware executing corresponding software. The hardware or the software includes one or more modules corresponding to the function.

In a possible design, the apparatus includes a transceiver module. Optionally, the apparatus further includes a processing module. The transceiver module may be, for example, at least one of a transceiver, a receiver, and a transmitter. Optionally, the transceiver module may include a radio frequency circuit or an antenna. The processing module may be a processor. Optionally, the apparatus further includes a storage module. The storage module may be, for example, a memory. When the storage module is included, the storage module is configured to store instructions or data. In a possible manner, the processing module is connected to the storage module. The processing module may execute the instructions stored in the storage module or instructions from another module, so that the apparatus performs the method according to the second aspect, the third aspect, the fourth aspect, and the possible implementations.

In another possible design, when the apparatus is the chip, the chip includes a transceiver module. Optionally, the chip further includes a processing module. The transceiver module may be, for example, an input/output interface, a pin, or a circuit on the chip. The processing module may be, for example, a processor. Optionally, the processing module enables the chip to implement the communication method according to any one of the second aspect, the third aspect, the fourth aspect, and the possible implementations. Optionally, the processing module may execute instructions in a storage module or invoke information such as data in the storage module. The storage module may be a storage module inside the chip, for example, a register or a cache. The storage module may alternatively be located inside the communication device but outside the chip, for example, a read-only memory (ROM) or another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the method according to the second aspect or the third aspect, and the possible implementations.

According to a seventh aspect, a computer storage medium is provided. The computer storage medium stores program code. The program code is used to indicate instructions for performing the method according to any one of the first aspect, the second aspect, the third aspect, the fourth aspect, or the possible implementations of the first aspect, the second aspect, the third aspect, or the fourth aspect.

According to an eighth aspect, a computer program product including instructions is provided. When the computer program product runs on a computer, the computer is enabled to perform the method according to any one of the first aspect, the second aspect, the third aspect, the fourth aspect, or the possible implementations of the first aspect, the second aspect, the third aspect, or the fourth aspect.

According to a ninth aspect, a communication system is provided. The communication system includes an apparatus that has a function of implementing the methods and the possible designs in the first aspect and an apparatus that has a function of implementing the methods and the possible designs in the second aspect.

Alternatively, the communication system includes an apparatus that has a function of implementing the methods and the possible designs in the first aspect, an apparatus that has a function of implementing the methods and the possible designs in the second aspect, and an apparatus that has a function of implementing the methods and the possible designs in the third aspect.

Alternatively, the communication system includes an apparatus that has a function of implementing the methods and the possible designs in the first aspect, an apparatus that has a function of implementing the methods and the possible designs in the second aspect, an apparatus that has a function of implementing the methods and the possible designs in the third aspect, and an apparatus that has a function of implementing the methods and the possible designs in the fourth aspect.

According to a tenth aspect, a processor is provided, is configured to be coupled to a memory, and is configured to perform the method according to any one of the first aspect, the second aspect, the third aspect, the fourth aspect, or the possible implementations of the first aspect, the second aspect, the third aspect, or the fourth aspect.

According to an eleventh aspect, a chip is provided. The chip includes a processor and a communication interface. The communication interface is configured to communicate with an external component or an internal component. The processor is configured to implement the method according to any one of the first aspect, the second aspect, the third aspect, the fourth aspect, or the possible implementations of the first aspect, the second aspect, the third aspect, or the fourth aspect.

Optionally, the chip may further include a memory. The memory stores instructions. The processor is configured to execute the instructions stored in the memory or instructions from another module. When the instructions are executed, the processor is configured to implement the method according to any one of the first aspect, the second aspect, the third aspect, the fourth aspect, or the possible implementations of the first aspect, the second aspect, the third aspect, or the fourth aspect.

Optionally, the chip may be integrated into a terminal device or an access network device.

DESCRIPTION OF EMBODIMENTS

Figure 1:
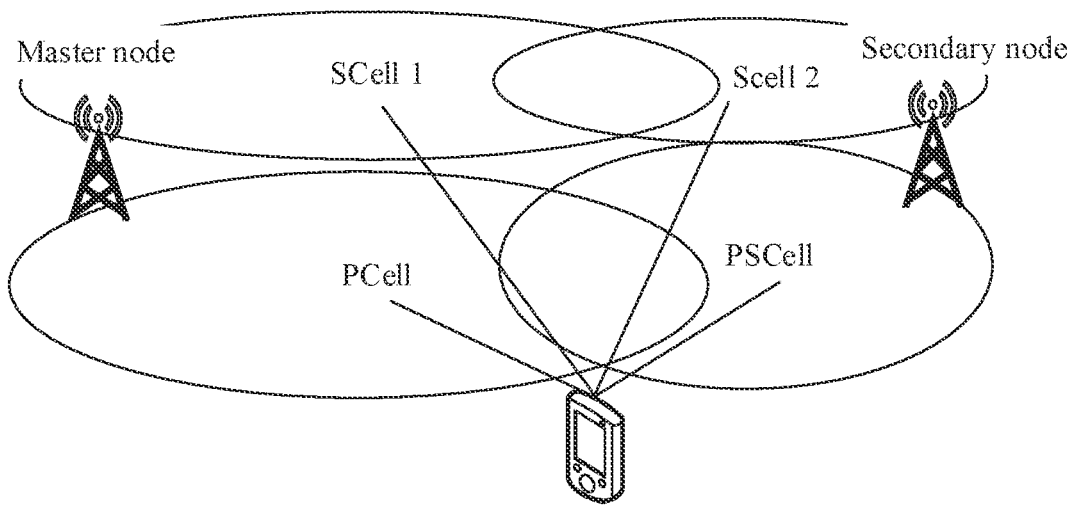
FIG. 1 is a schematic diagram of a network architecture to which an embodiment of this application is applied.

The following describes technical solutions in this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS) system, a 5th generation (5G) system, or a new radio (NR) system.

A terminal device in the embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides a user with voice/data connectivity, for example, a handheld device or a vehicle-mounted device that has a wireless connection function. Currently, examples of some terminals are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), or the like. This is not limited in the embodiments of this application.

By way of example rather than limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn or integrated into clothes or an accessory of a user. The wearable device is not only a hardware device, but is used to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that focus only on one type of application function and need to work with other devices such as smartphones, such as various smart bands or smart jewelry for monitoring physical signs.

In addition, the terminal device in the embodiments of this application may alternatively be a terminal device in an internet of things (IoT) system. An IoT is an important component of development of future information technologies. A main technical feature of the IoT is to connect an object to a network by using a communication technology, to implement an intelligent network of human-machine interconnection and thing-thing interconnection.

In addition, an access network device in the embodiments of this application may be a device configured to communicate with the terminal device. The access network device may also be referred to as an access device or a radio access network device, may be an evolved NodeB (evolved NodeB, eNB or eNodeB) in the LTE system, or may be a radio controller in a cloud radio access network (CRAN) scenario. Alternatively, the access network device may be a relay station, an access point, a vehicle-mounted device, a wearable device, an access network device in the 5G network, or an access network device in the future evolved PLMN network, may be an access point (AP) in a WLAN, or may be a gNB in the new radio (new radio, NR) system. This is not limited in the embodiments of this application.

In addition, in the embodiments of this application, the access network device is a device in a RAN, in other words, is a RAN node that connects the terminal device to a wireless network. For example, by way of example rather than limitation, the access network device may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a base band unit (BBU), or a wireless fidelity (Wi-Fi) access point (AP). In a network structure, a network device may include a centralized unit (CU) node, a distributed unit (DU) node, a RAN device including the CU node and the DU node, or a RAN device including a CU control plane node (CU-CP node), a CU user plane node (CU-UP node), and the DU node.

The access network device serves a cell. The terminal device communicates with the access network device by using a transmission resource (for example, a frequency domain resource or a spectrum resource) used for the cell. The cell may be a cell corresponding to the access network device (for example, a base station). The cell may belong to a macro base station, or may belong to a base station corresponding to a small cell. The small cell herein may include a metro cell, a micro cell, a pico cell, a femto cell, or the like. These small cells have features of small coverage and a low transmit power, and are suitable for providing a high-rate data transmission service.

Optionally, a plurality of cells may simultaneously work on a same frequency on a carrier in the LTE system or the 5G system. In some scenarios, it may also be considered that a concept of the carrier is equivalent to a time point at which of the cell. For example, in a carrier aggregation (CA) scenario, when a secondary carrier is configured for the terminal device, both a carrier index of the secondary carrier and a cell identifier (cell identifier, Cell ID) of a secondary cell working on the secondary carrier are carried. In this case, it may be considered that the concept of the carrier is equivalent to the concept of the cell. For example, that the terminal device accesses a carrier is equivalent to a time point at which the terminal device accesses a cell.

It may be understood that, in the embodiments of this application, the terminal device and/or the access network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

FIG. 1 is a schematic diagram of a network architecture to which an embodiment of this application is applied. As shown in FIG. 1, a terminal device may perform dual-connectivity (DC) with two access network devices simultaneously. In an example, the two access network devices are respectively a master node and a secondary node. In the two access network devices, an access network device that is responsible for exchanging a radio resource control message with the terminal device and is responsible for interacting with a core network control plane entity is the master mode (MN), and the other radio access network device is the secondary node (SN). In the embodiments of this application, the master node MN may alternatively be referred to as a master access network device, and the secondary base station SN may alternatively be referred to as a secondary access network device.

Similarly, the terminal device may alternatively have communication connections to a plurality of access network devices simultaneously and may send and receive data. The communication connections may be referred to as multi-connectivity (multi-connectivity, MC). In the plurality of access network devices, one access network device may be responsible for exchanging a radio resource control message with the terminal device, and is responsible for interacting with a core network control plane entity. In this case, the access network device may be referred to as an MN, and remaining access network devices may be referred to as SNs.

In the embodiments of this application, the MN and the SN may be base stations of a same radio access type (RAT), or may be base stations of different RATs.

In a dual-connectivity DC configuration, serving cells of the terminal device that belongs to the master node usually include a primary cell Pcell (or a special cell SpCell) and 0 to n secondary cells SCells, and a serving cell group belongs to the master node is usually referred to as a master cell group MCG; serving cells of the terminal device that are belongs to the secondary node include a primary secondary cell PScell (or a special cell SpCell) and 0 to m secondary cells SCells, and a serving cell group belongs to the secondary node is usually referred to as a secondary cell group SCG. Herein, n and m are respectively positive integers greater than 1.

When the terminal device is in dual-connectivity DC mode, the terminal device detects whether a connection failure occurs on a link between the terminal device and the MCG and whether a connection failure occurs on a link between the terminal device and the SCG. In the embodiments of this application, "a connection failure occurs on a link between the terminal device and the MCG" may be referred to as "the connection failure occurs in the MCG", and "a connection failure occurs on a link between the terminal device and the SCG" may be referred to as "the connection failure occurs in the SCG". However, the embodiments of this application are not limited thereto.

If the connection failure occurs on the link between the terminal device and the SCG, the terminal device still remains in connected mode, and may report connection failure information of the SCG by using the MCG, and attempt to recover a connection between the terminal device and the SCG. When the connection failure occurs in the MCG, in a possible case, the terminal device performs a reestablishment procedure; in another possible case, the terminal device may not trigger the reestablishment procedure, but recover the MCG. The MCG recovery process may also be referred to as an MCG recovery mechanism.

In an example, the MCG recovery mechanism means that if the connection failure occurs on the link between the terminal device and the MCG, the terminal device may report connection failure information of the MCG by using the SCG, and attempt to recover a connection between the terminal device and the MCG.

In an example, that the connection failure occurs in the MCG in the embodiments of this application may mean that a connection failure occurs on a link between the terminal device and the primary cell (primary cell, Pcell) in the MCG or the special cell (Special Cell, SpCell) in the MCG. Alternatively, that the connection failure occurs in the MCG may mean that connection failures occur on all links between the terminal device and all cells in the MCG.

Similarly, that the connection failure occurs in the SCG in the embodiments of this application may mean that a connection failure occurs on a link between the terminal device and the primary secondary cell (PScell) in the SCG or the special cell (SpCell) in the SCG. Alternatively, that the connection failure occurs in the SCG may mean that connection failures occur on all links between the terminal device and all cells in the SCG.

In an example of MCG recovery, the terminal device may indicate an MCG connection failure to the MCG by using an SCG split signaling radio bearer (SRB) 1, an SRB 3, or a new SCG SRB, to perform MCG fast recovery.

Figure 2:
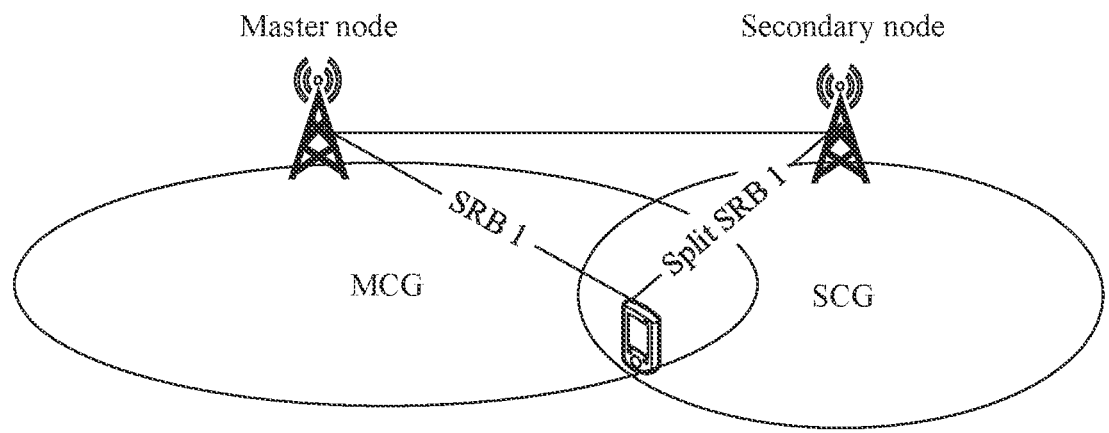
FIG. 2 shows an example of performing MCG fast recovery by using a split SRB 1.

FIG. 2 shows an example of performing MCG fast recovery by using a split SRB 1. After MCG fast recovery, a terminal device performs data transmission with a master node by using a split SRB 1 between the terminal device and a secondary node and a connection between the secondary node and the master node, for example, receives a handover command (HO CMD) message sent by the master node. It may be understood that a handover command message is used as an example for description herein. However, this embodiment of this application is not limited to the message. For example, the terminal device may further receive, by using an SCG, at least one of a reconfiguration message, a reconfiguration with synchronization 0 message, and a reconfiguration message including a mobility control parameter that are sent by the master node.

Generally, a connection failure cause may include at least one of the following: a handover failure (HOF), a radio link failure (RLF), a reconfiguration with synchronization failure, a failure of a handover from NR to another system, an integrity check failure, an RRC connection reconfiguration failure, and the like. This is not limited in the embodiments of this application.

The MCG recovery mechanism may be used in a handover scenario. In a handover process, inappropriate configuration of a handover parameter may cause problems such as a too late handover (too late HO), a too early handover (too early HO), and a handover to a wrong cell (HO to wrong cell). Consequently, a connection failure occurs on the terminal device in the MCG. After the connection failure occurs on the terminal device in the MCG, the terminal device may recover the MCG by using the SCG.

The too late HO means that a connection failure occurs after the terminal device is connected in a current serving cell for a period of time, and the terminal device attempts to reestablish a connection in another cell. For example, before the connection failure occurs, the terminal device remains in connected mode in the current serving cell. Quality of the current serving cell deteriorates, but the terminal device receives no handover command. Therefore, the terminal device detects the connection failure in the current serving cell, and then the terminal device attempts to reestablish the connection in the another cell.

It should be noted that, in the embodiments of this application, "a period of time" may be a relatively long period of time, namely, a relatively long time segment. A specific length of "a period of time" is not limited in the embodiments. For example, a value of the period of time may be greater than is. That is, the connection failure occurs after the terminal device is connected in the current serving cell for at least 1 s.

The too early HO means that a connection failure occurs soon after the terminal device is successfully handed over from a source cell to a target cell, or the connection failure occurs in a process of handing over from the source cell to the target cell, and the terminal device attempts to reestablish a connection in the source cell. For example, the terminal device receives a handover command in the source cell, the connection failure occurs soon after a handover to the target cell, or a handover failure occurs in the handover process, and the terminal device attempts to reestablish the connection in the source cell.

It should be noted that, in the embodiments of this application, "soon" may be understood as a relatively short time segment. A specific length of the time segment is not limited in the embodiments. For example, a value of the time segment corresponding to "soon" may be less than 10 ms. That is, the connection failure occurs within 10 ms after the terminal device is successfully handed over from the source cell to the target cell.

The HO to wrong cell means that the connection failure occurs soon after the terminal device is successfully handed over from the source cell to the target cell, or the connection failure occurs in the process of handing over from the source cell to the target cell, and the terminal device attempts to reestablish a connection in another cell (the another cell is cell different from the source cell and the target cell). For example, the terminal device receives the handover command in the source cell, the connection failure occurs soon after the handover to the target cell, or the handover failure occurs in the handover process, and the terminal device attempts to reestablish the connection in the another cell.

In a mobility robustness optimisation (MRO) mechanism, the terminal device records parameters (for example, parameters that are of cells and that are experienced in a mobility failure process and time information) in the mobility failure process, and reports the parameters to a network device, so that the network device can determine a cell in which a failure occurs, to better adjust a handover-related parameter.

In an example, a record report (which may be referred to as a failure report) of MRO may include at least one of the following.

(1) Failed primary cell identifier (failedPcellId): information about a primary cell in which a connection fails, where the failure is detected by the terminal device, or information about a target primary cell to which a handover fails.

Optionally, the failure report may alternatively not include the failed primary cell identifier (failedPcellId), but include a failed cell identifier (failedCellId). The failed cell identifier is information about a cell in which a connection fails, where the failure is detected by the terminal device, or information about a target cell to which a handover fails. This is not limited in the embodiments of this application.

(2) Connection failure type (connectionFailureType).

In an example, the connection failure type may be the RLF or the HOF.

(3) Previous primary cell identifier (previousPcellId): information about a previous primary cell in which the terminal device receives a handover command last time.

Optionally, the failure report may alternatively not include the previous primary cell identifier (previousPcellId), but include a previous cell identifier (previousCellId). The previous cell identifier is information about a previous cell in which the terminal device receives a handover command last time. This is not limited in the embodiments of this application.

(4) Reestablishment cell identifier (reestablishmentCellId): information about a cell in which reestablishment is attempted after a connection fails.

(5) Time of a connection failure (timeConnFailure): time since receiving an HO command last time to a time point at which a connection fails.

(6) Time since a failure (timeSinceFailure): a time length that starts to be recorded since the connection fails. The time since the failure usually refers to time since the connection fails to report the failure report.

In an example, the failure report may be an RLF report (RLF report). This is not limited in the embodiments of this application.

Information about a cell may include at least one of a cell global identifier (CGI), a physical cell identifier (PCI), and a cell identifier of the cell.

Optionally, the information about the cell mentioned above may further include at least one of cell quality, frequency information, and a beam identifier. The cell quality or beam quality may include at least one of reference signal received power (RSRP), reference signal received quality (RSRQ), a signal-to-noise ratio (SNR), a signal to interference plus noise ratio (SINR), a reference signal strength indication (RSSI), or quality of another signal.

A beam may be understood as a spatial resource, and may be a transmit or receive precoding vector having energy transmission directivity. The energy transmission directivity may mean that precoding processing is performed, by using a precoding vector, on a signal that needs to be sent, a signal on which the precoding processing is performed has spatial directivity, and a signal on which the precoding processing is performed by using the precoding vector has relatively good received power, for example, satisfies a received demodulation signal-to-noise ratio. The energy transmission directivity may alternatively mean that receiving, by using the precoding vector, same signals sent from different spatial positions and having different receive powers. The transmit or receive precoding vector can be identified by using index information. The index information may correspond to a resource identity (ID) configured for the terminal device. For example, the index information may correspond to a reference signal identifier and a reference signal resource that are configured. The reference signal may be used for channel measurement, channel estimation, or the like. The reference signal resource may be used to configure transmission attributes, for example, a time-frequency resource position, a port mapping relationship, a power factor, and a scrambling code, of the reference signal. For details, refer to a conventional technology. A transmit end device may send the reference signal based on the reference signal resource, and a receive end device may receive the reference signal based on the reference signal resource. The reference signal may include, for example, a channel state information reference signal (CSI-RS), a synchronization signal block (SSB), and a sounding reference signal (SRS). Correspondingly, the reference signal resource may include a CSI-RS resource, an SSB resource, and an SRS resource. To distinguish between different reference signal resources, each reference signal resource may correspond to an identifier of the reference signal resource. For example, CSI-RS resources are distinguished by using CSI-RS identifiers (for example, CSI-RS indexes), SSB resources are distinguished by using SSB identifiers (for example, SSB indexes), and SRS resources are distinguished by using SRS resource identifiers (for example, SRS resource IDs).

Optionally, the information about the cell may further include the beam identifier and the beam quality. The cell quality or the beam quality may be obtained by measuring at least one of a downlink synchronization channel, a channel state information reference signal (channel state information (CSI) reference signal, CSI-RS), a demodulation reference signal (DMRS), a cell-specific reference signal (CRS), a synchronization signal (SS), a synchronization signal/physical broadcast channel block (SS/PBCH Block), or another downlink signal.

Optionally, the information about the cell may further include information used to determine a standard of the cell. A standard of the network device includes LTE, NR, eLTE, and the like. This is not limited in the embodiments of this application. Optionally, the information about the cell may further include identifier information of a private network to which the cell belongs. The private network is a network that provides a service only for a terminal device that has subscription information with the private network. Generally, the private network allows only the terminal device that has the subscription information with the network to camp on the private network. The private network further needs to be marked by using a private network identifier in addition to a PLMN identifier. The private network identifier may include a non-public network identifier (NPN ID) and/or a closed access group identifier (CAG ID). For example, a terminal device may determine, based on a PLMN identifier and a private network identifier in subscription information of the terminal device, whether the terminal device can camp on a private network cell. For example, the PLMN identifier to which the terminal device subscribes is a PLMN ID 1, and the private network identifier is a CAG ID 1. If a private network cell 1 sends the PLMN ID 1 and the CAG ID 1, the terminal device may camp on the private network cell 1 or be handed over to the private network cell 1 to perform service transmission. If a private network cell 2 sends the PLMN ID 1 and a CAG ID 2, the terminal device cannot camp on the private network cell 2 or be handed over to the private network cell 2.

After determining the failure report, the terminal device may report the failure report to an access network device X to which an access cell X belongs. In the embodiments of this application, the access cell X may be a reestablishment attempt cell, or may be another cell. In an example, when the terminal device is not required to report the failure report in the reestablishment attempt cell, the terminal device may report the failure report when subsequently accessing another cell. This is not limited in the embodiments of this application.

For example, after receiving the failure report, the access network device X to which the access cell X belongs may determine, based on the failed primary cell identifier (for example, the failedPcellId is B) in the failure report, a cell B in which a connection fails, and then send a failure indication to an access network device B to which the cell B belongs, where the failure indication includes the received failure report.

If the failedPcellId and the previousPcellId (for example, the previousPcellId is a cell A) are different, the access network device B generates an analyzed handover report (HO report) based on the failure report in the failure indication, and determines whether to send the HO report to an access network device A to which the cell A belongs. In an example, the HO report may carry a handover report type (handover report type, for example, a too late HO/a too early HO/an HO to wrong cell), information about the reestablishment attempt cell, cell information of the failed cell B, and cell information of the source cell A. Specifically, for the information carried in the HO report, refer to the foregoing description.

In an example, the handover report may also include the failure report. However, the embodiments of this application are not limited thereto.

In an example, the failure indication may be an RLF indication. However, the embodiments of this application are not limited thereto.

Figure 3:
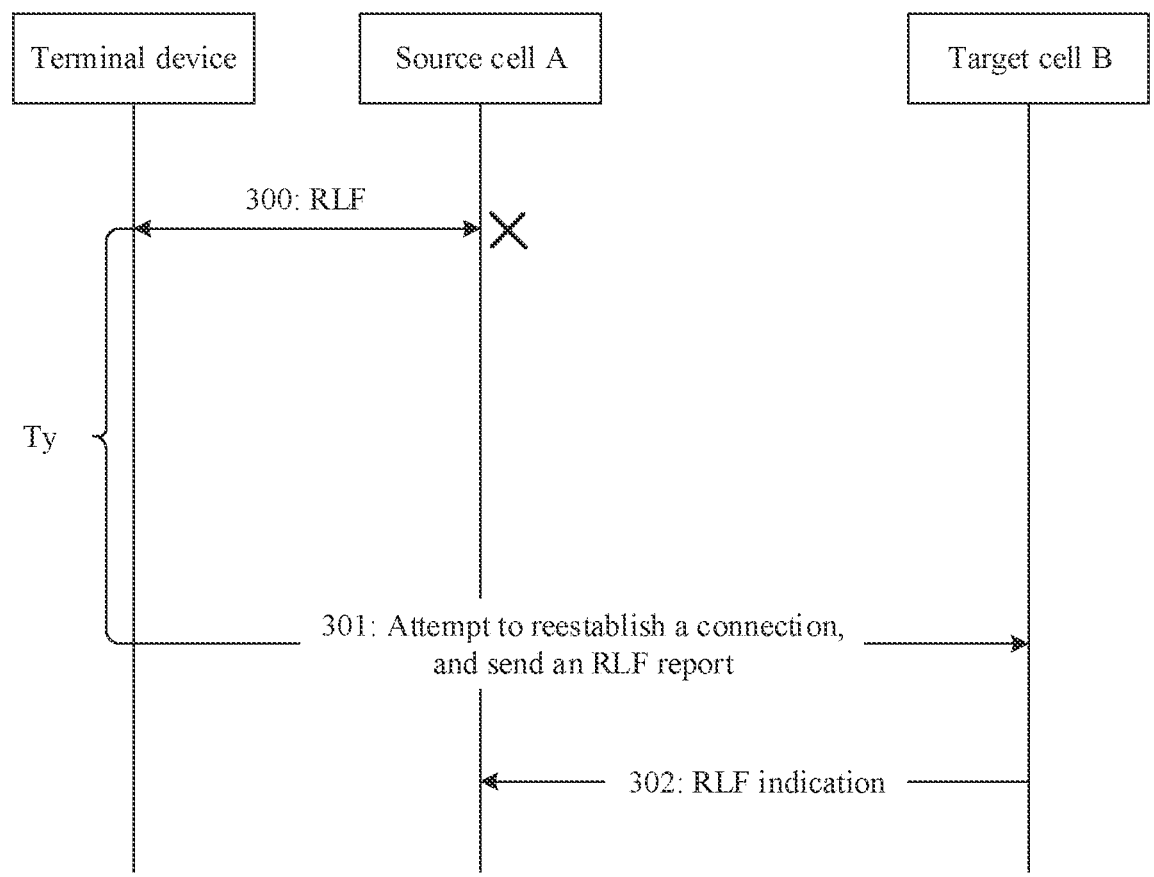
FIG. 3 shows an example of reporting a failure report in a too late HO scenario.
Figure 4:
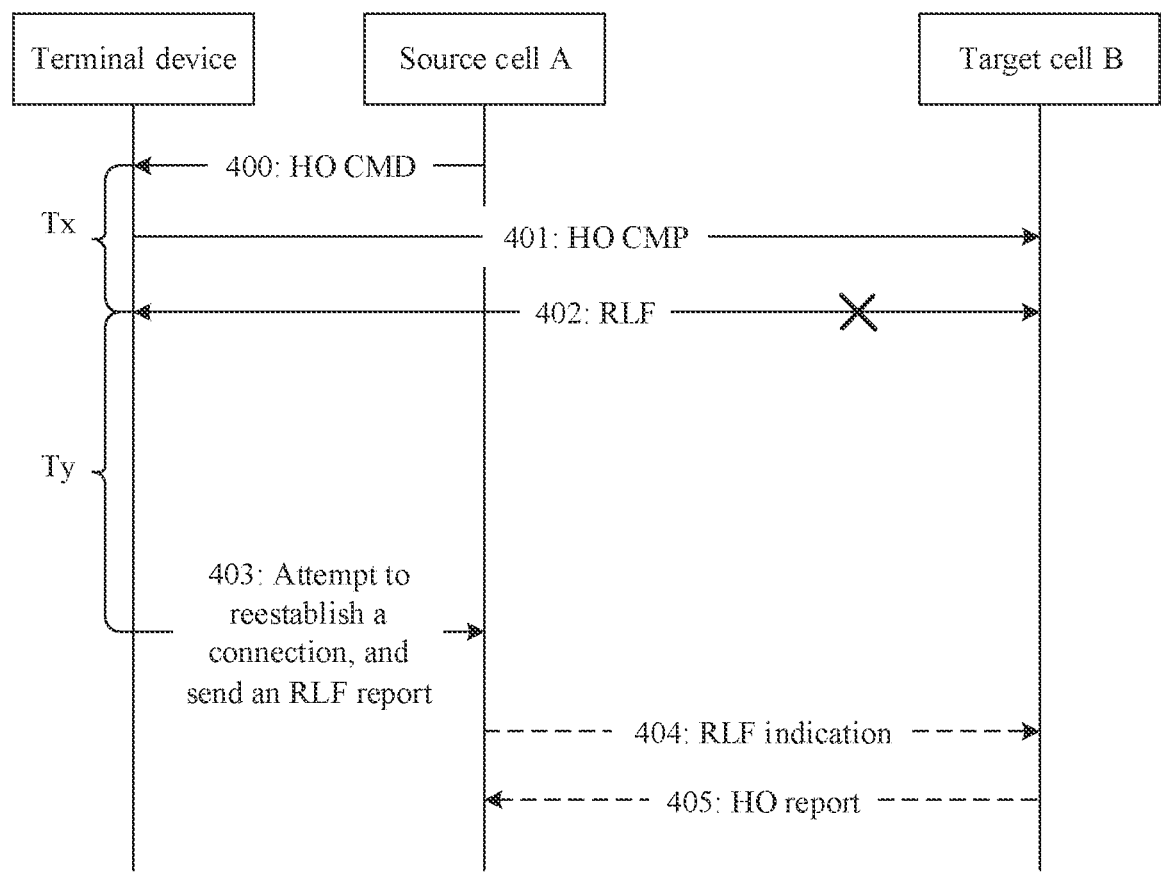
FIG. 4 shows an example of reporting an RLF report in a too early HO.

With reference to FIG. 3 and FIG. 4, the following separately describes examples of failure reports in a too late HO scenario and a too early HO scenario.

FIG. 3 shows an example of reporting a failure report in a too late HO scenario. As shown in FIG. 3, an RLF occurs on a terminal device when the terminal device receives no HO command in a source cell A.

300: The RLF occurs on the terminal device in the source cell A.

In an example, the RLF occurs on the terminal device after the terminal device is connected in the source cell A for a period of time. A is an identifier of the source cell A.

301: The terminal device attempts to reestablish a connection in a target cell B, and sends an RLF report.

B is an identifier of the target cell B.

In an example, the terminal device may record the following information.

(1) Failed primary cell identifier (failedPcellId): A.

Herein, an example in which cell information of the source cell A is A is used for description. However, this embodiment of this application is not limited thereto.

(2) connectionFailureType: an RLF.

(3) previousPcellId: not exist.

In an example, because the terminal device changes from an unconnected mode to a connected mode in the source cell A, and it is considered that the terminal device has received no handover command before accessing the source cell A, the cell does not need to be recorded. Otherwise, the terminal device records cell information of a cell S that receives a handover command last time.

It may be understood that, in this embodiment of this application, that information does not exist may mean that a record of the information is empty, or the information may not need to be created.

(4) reestablishmentCellId: B.

Herein, an example in which cell information of the target cell B is B is used for description. However, this embodiment of this application is not limited thereto.

(5) timeConnFailure: time since receiving an HO command last time to a time point at which a connection fails.

In an example, if the terminal device has received no handover command before accessing the source cell A, the information element may not be recorded, or is set to a maximum value.

Alternatively, in another example, when the terminal device receives the handover command of the cell S last time, the terminal device records time since the handover command is received in the cell S to a time point at which the RLF occurs in the cell A.

(6) timeSinceFailure: Ty, where Ty is a time length that starts to be recorded when the connection fails, and usually refers to time since the connection fails to report the RLF report.

In an example, the terminal device sends the RLF report to a base station B of the reestablishment attempt cell B. For example, the terminal device may enable at least one of the foregoing information (1) to (6) to be included in the RLF report. In other words, information in the RLF report of the terminal device may be equal to or less than the information recorded by the terminal device. It may be understood that the foregoing information (1) to (6) is merely an example, and the terminal device may record at least one of the foregoing information, or may record information other than the foregoing information.

In some possible implementations, the base station B and a base station A may be a same node. This is not limited in this embodiment of this application. Optionally, when the base station B is the same as the base station A, step 302 does not need to be performed.

It should be noted that step 301 may be implemented by using one piece of signaling, or by using at least two (including two or more) pieces of signaling. In an example, in this embodiment of this application, signaling used by the terminal device to attempt to reestablish a connection in the target cell B and signaling used by the terminal device to send the RLF report to the base station B may be same signaling or different signaling. This is not limited in this embodiment of this application.

302: The base station B determines, based on the RLF report, that a cell in which the connection failure occurs is the cell A of the base station A, and sends an RLF indication (indication) to the base station A of the cell A, where the RLF indication carries the RLF report.

When determining, based on the RLF report, that the terminal device remains in connected mode for a long time before the RLF occurs in the cell A, the base station A may determine that a mobility parameter of the cell A is inappropriately set. Therefore, the base station A determines that a too late handover occurs. Correspondingly, after receiving the RLF indication, the base station A adjusts the mobility parameter of the cell A based on the RLF report carried in the RLF indication.

Optionally, the base station B may determine, based on the RLF report, that a parameter of the base station A is inappropriately set, and then send indication information to the base station A, to indicate that a mobility parameter device of the base station A is inappropriately set.

Optionally, because the terminal device remains in connected state for a long time before the RLF occurs in the cell A, even if the terminal device is handed over from a previous master node to the cell A belongs to the base station A, for example, a base station S of the cell S is handed over to the cell A, the base station A does not need to send an HO report to the base station S.

In some possible implementations, when the terminal device is handed over from the cell S to the cell A within a quite short time before the RLF occurs in the cell A and the base station S to which the cell S belongs is different from the base station A, the base station A needs to send the HO report to the base station S.

FIG. 4 shows an example of reporting an RLF report in a too early HO. A communication method shown in FIG. 4 includes 401 to 406.

400: A terminal device receives a handover command (HO CMD) in a source cell A.

401: A terminal device completes a handover to a target cell B, and sends a handover complete message (HO CMP) to the target cell B.

402: A connection failure occurs, for example, an RLF occurs, soon after the terminal device completes the handover.

Alternatively, step 401 and step 402 may be replaced as follows: The terminal device does not complete an HO in the target cell B, that is, a handover failure (HO failure, HOF) occurs in a handover process.

403: The terminal device attempts to reestablish a connection in the source cell A, and sends an RLF report.

It may be understood that a procedure in this embodiment is also applicable to a scenario of a HO to wrong cell, and a difference from the too early HO lies only in that, in step 403, the terminal device attempts to reestablish a connection in a non-source cell and a non-target cell, for example, attempts to reestablish a connection in a cell C.

The terminal device may record the following information.

(1) failedPcellId: B.

(2) connectionFailureType:

In an example, when the RLF occurs after step 400, the connectionFailureType is the RLF; when the HOF occurs after 400, the connectionFailureType is the HOF.

(3) previousPcellId: A.

(4) reestablishmentCellId:

In an example, when the terminal device attempts to reestablish the connection in the source cell A, the reestablishmentCellId is A; when the terminal device attempts to reestablish the connection in the cell C (C is a cell identifier), the reestablishmentCellId is C.

(5) timeConnFailure: Tx, where Tx is time since receiving an HO command last time to a time point at which a connection fails.

(6) timeSinceFailure: Ty, where Ty is a time length that starts to be recorded when the connection fails, and usually refers to time since the connection fails to report the RLF report.

In an example, the terminal device sends the RLF report to a base station (for example, a base station X) of a reestablishment attempt cell. The base station base station X may be a base station A, a base station C, or any other node that receives the RLF report.

For example, the terminal device may enable at least one of the foregoing information (1) to (6) to be included in the RLF report. In other words, information in the RLF report of the terminal device may be equal to or less than the information recorded by the terminal device. It may be understood that the foregoing information (1) to (6) is merely an example, and the terminal device may record at least one of the foregoing information, or may record information other than the foregoing information.

This embodiment is described by using an example in which the terminal device sends, in the source cell A, the RLF report to the base station A to which the source cell A belongs.

It should be noted that step 403 may be implemented by using one piece of signaling, or by using at least two (including two or more) pieces of signaling. In an example, in this embodiment of this application, signaling used by the terminal device to attempt to reestablish a connection in the source cell A and signaling used by the terminal device to send the RLF report to the base station X may be same signaling or different signaling. This is not limited in this embodiment of this application.

404: The base station A to which the source cell A belongs sends an RLF indication to a base station B to which the target cell B belongs.

In a scenario of the too early HO/the HO to wrong cell, the base station A that receives the RLF report determines, based on (1) the cell information of the failed primary cell identifier B recorded in the RLF report, the base station B to which the cell B belongs. Then, the base station A sends the RLF indication to the base station B, where the RLF indication carries the RLF report.

405: The base station B sends an HO report to the base station A.

The node B analyzes and generates the HO report based on the RLF report, for example, may determine, based on (5) and (2) in the RLF report, that the HOF occurs on the terminal device in the handover process or the RLF occurs on the terminal device soon after the handover. Then, the base station B determines, based on (4), that the current RLF is caused by the too early HO or the HO to wrong cell. Then, the base station B determines, based on (3) the previousP-CellId: A in the RLF report, that a mobility parameter of the base station A to which the cell A belongs is inappropriately set. Therefore, the base station B sends the HO report to the base station A, where the HO report carries the RLF report. Then, the base station A adjusts the mobility parameter based on the HO report.

Optionally, for procedure descriptions and information element descriptions of the RLF indication and the HO report, refer to descriptions in a protocol, for example, descriptions in section 22.4.2 in 3GPP TS 36.300 v15.4.0 and TS 36.423 v15.4.0. Details are not described herein again.

In the handover scenarios shown in FIG. 3 and FIG. 4, if the terminal device is configured as DC in the source cell, is configured as DC in the target cell, or is configured as DC in the source cell and is also configured as DC in the target cell, when MCG recovery is introduced, after the terminal device detects that a connection failure occurs in an MCG, the terminal device (preferentially) performs MCG recovery (for example, MCG fast recovery) by using an SCG. Based on this, in the embodiments of this application, the terminal device may record information about the SCG in which master cell group MCG connection recovery is attempted when the terminal device detects that the connection failure occurs in the MCG, and report the information about the SCG to an access network device via the failure report.

Figure 5:
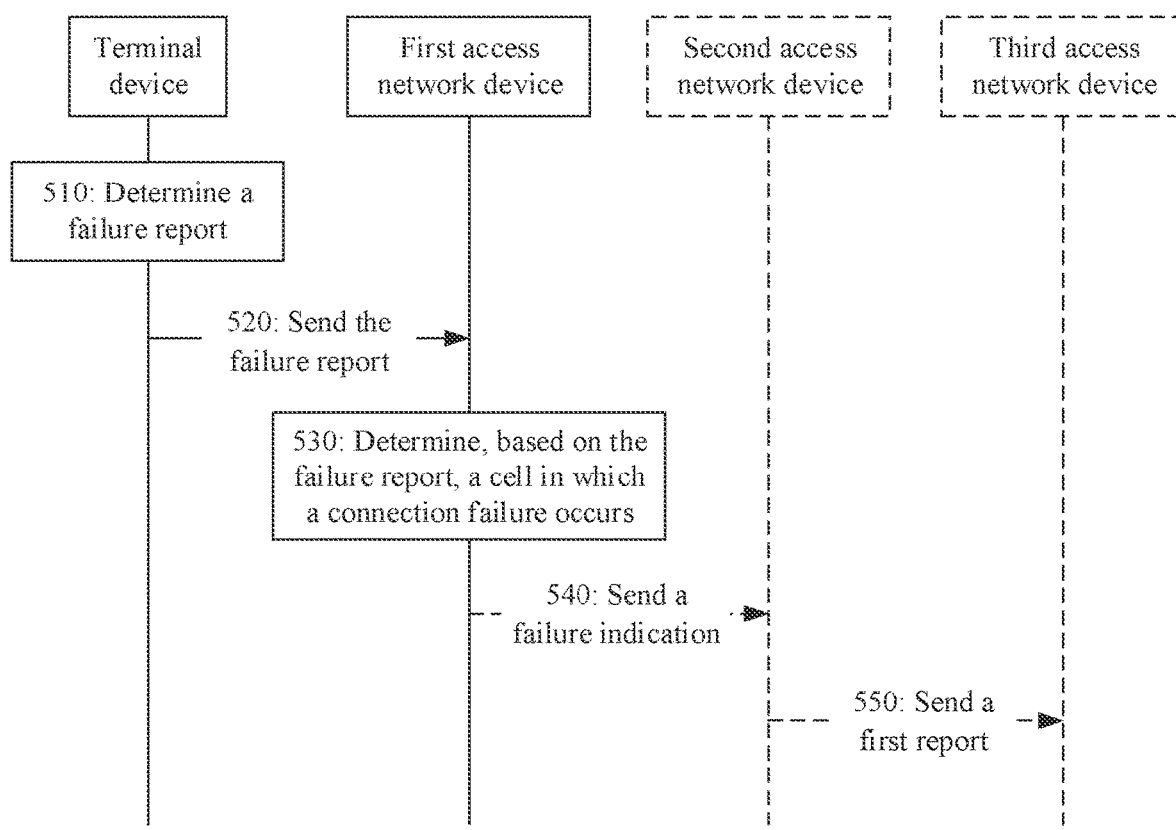
FIG. 5 is a schematic flowchart of a communication method according to an embodiment of this application.

FIG. 5 is a schematic flowchart of a communication method according to an embodiment of this application from a perspective of device interaction. The communication method is applied to a handover scenario, for example, a scenario in which a terminal device is handed over from a source access network device to a target access network device. The terminal device is configured as DC in a source cell, and/or is configured as DC in a target cell.

The technical solution in this application may be applied to the wireless communication system shown in FIG. 1 or FIG. 2, and communication apparatuses in the wireless communication system may have a wireless communication connection relationship. The communication apparatuses may include, for example, an access network device or a chip configured in the access network device. The communication apparatus further includes the terminal device or a chip configured in the terminal device.

It should be noted that, in this embodiment of this application, there may be two, three, or more access network devices. This is not limited in this embodiment of this application.

In an example, when the system includes three access network devices, the at least three access network devices may be, for example, a source primary access network device, a source secondary access network device, and a target access network device. In some embodiments, the target access network device and the source secondary access network device may be a same access network device or different access network devices. This is not limited in this embodiment of this application.

In another example, when the system includes three access network devices, the at least three access network devices may be, for example, a source access network device, a target primary access network device, and a target secondary access network device. In some embodiments, the source access network device and the target secondary access network device may be a same access network device or different access network devices. This is not limited in this embodiment of this application.

As shown in FIG. 5, the communication method may include steps 510 to 530.

510: The terminal device determines a failure report, where the failure report includes information about a cell in an SCG in which master cell group MCG connection recovery is attempted when the terminal device detects that a connection failure occurs in an MCG.

In some embodiments, when the terminal device is handed over from the source cell to the target cell, a connection failure (for example, an RLF or an HOF) may occur in the source cell or the target cell. Because the terminal device is configured as DC in the source cell or is configured as DC in the target cell, when the terminal device detects that a connection failure occurs in a master cell group MCG of the source cell or the target cell, the terminal device may recover the MCG by using a configured SCG.

In an example, an RLF may occur on the terminal device in a master cell group MCG. Specifically, the RLF may occur on the terminal device in a master cell group MCG of the source cell. Alternatively, the terminal device completes handover, but the RLF occurs in a master cell group MCG of the target cell soon.

In another example, an HOF may occur on the terminal device in a master cell group MCG. Specifically, the HOF may occur in a process in which the terminal device is handed over to an MCG of the target cell.

In a handover scenario, to enable an access network device to appropriately adjust a mobility parameter, the terminal device needs to determine the failure report, and the failure report needs to record the information about the cell in the SCG in which master cell group MCG connection recovery is attempted when it is detected that the connection failure occurs in the MCG.

In this embodiment of this application, the information about the cell in the SCG includes at least one of information about cells in the following two types of SCGs.

A first type of SCG is an SCG in which a connection failure occurs, where the connection failure is detected by the terminal device after detecting that the connection failure occurs in the master cell group MCG.

Optionally, the SCG in which the connection failure detected by the terminal device occurs may mean that the terminal device cannot perform MCG fast recovery in the SCG, or that the terminal device performs MCG fast recovery in the SCG, but cannot receive a response message sent by the SCG. For example, after an RLF occurs on the terminal device in the MCG, the terminal device fails to perform MCG fast recovery in the SCG, that is, an RLF occurs on the terminal device in the SCG again.

It may be understood that, in this embodiment of this application, the response message may be, for example, an RRC reconfiguration message, and may be specifically any one of a handover command message, a reconfiguration message, a reconfiguration with synchronization (reconfiguration with sync) message, or a reconfiguration message including a mobility control parameter. This is not limited in this embodiment of this application.

A second type of SCG is an SCG in which master cell group MCG connection recovery is successfully performed after the terminal device detects that the connection failure occurs in the MCG.

Optionally, successfully performing MCG connection recovery may mean that the terminal device can receive a response message sent by the SCG. In an example, after an RLF occurs on the terminal device in the MCG, the terminal device successfully performs MCG fast recovery in the SCG. In this case, the terminal device may perform data and/or signaling transmission with the MCG by using the SCG.

An example in which the response message is the handover command message is used. In this case, the terminal device may receive, by using the SCG, the handover command message sent by the MCG. That is, in this case, the SCG is a cell in which the handover command message is received after it is detected that the connection failure occurs in the MCG. An example in which the response message is the reconfiguration message is used. In this case, the terminal device may receive, by using the SCG, the reconfiguration message sent by the MCG. That is, in this case, the SCG is a cell in which the reconfiguration message is received after it is detected that the connection failure occurs in the MCG.

It should be noted that, in this embodiment of this application, an example in which the response message is the handover command message or the reconfiguration message is used for description. However, this embodiment of this application is not limited thereto. For example, the terminal device may alternatively receive, by using the SCG, the reconfiguration with synchronization (reconfiguration with sync) message, the reconfiguration message including the mobility control parameter, and the like that are sent by the MCG, which all fall within the protection scope of this embodiment of this application.

In an example, in this case, the SCG may be denoted as last previousCellId.

In some embodiments of this application, the connection failure that occurs in the MCG and that is detected by the terminal device may be referred to as the first connection failure, and the MCG is referred to as a cell in which a connection fails for the first time.

It may be understood that, in this embodiment of this application, the MCG in which the connection failure occurs may be a primary cell (Pcell) in the MCG or a special cell (SpCell) in the MCG, or the MCG may be all cells in the MCG. This is not limited in this embodiment of this application.

Optionally, before the first connection failure, the terminal device may receive a handover command, and the handover command may be referred to as the first handover command.

When the terminal device attempts MCG connection recovery in the SCG after the connection failure occurs in the MCG, the following two cases may occur.

Case 1

Case 1 corresponds to the foregoing first type of SCG. That is, after the connection failure occurs on the terminal device in the MCG, MCG connection recovery fails to be performed in the SCG. In this case, the connection failure occurring in the SCG is referred to as one more connection failure, and the SCG is referred to as a cell in which a connection fails again. This is not limited in this embodiment of this application.

In some possible embodiments, the terminal device recovers an MCG in the SCG, the terminal device may fail to send an MCG failure report in the SCG, and an SCG connection failure occurs. Alternatively, the terminal device may successfully send an MCG failure report to the SCG, and an SCG connection failure occurs before the response message (for example, the handover command message/the reconfiguration message) is received. This is not limited in this embodiment of this application.

It may be understood that, in this embodiment of this application, the SCG in which the connection failure occurs may be a primary secondary cell (PScell) in the SCG or a special cell (SpCell) in the SCG, or may be all cells in the SCG.

In some possible descriptions, the one more connection failure may be referred to as the second connection failure, and the SCG is referred to as a cell in which a connection fails for the second time. In some possible descriptions, the connection failure occurring in the SCG may also be referred to as the last connection failure, and the SCG is referred to as a cell in which a connection fails for the last time. In this case, information about the cell in the SCG may be referred to as information about a primary secondary cell or a special cell in which a connection failure occurs, where the connection failure is detected for the second time or the last time. In an example, the information about the cell in the SCG may be denoted as last failedPScellId.

Case 2

Case 2 corresponds to the foregoing second type of SCG. After the connection failure occurs on the terminal device in the MCG, the MCG is successfully recovered in the SCG. In this case, the terminal device may receive the response message by using the SCG.

In some embodiments, the terminal device may receive the handover command message by using the SCG, to indicate the terminal device to be handed over to another cell. In some embodiments, the terminal device may receive the reconfiguration message by using the SCG, to indicate a reconfigured parameter of the MCG, so that the terminal device attempts to reestablish a connection to the MCG.

In some possible descriptions, a handover command/the reconfiguration message received by using the SCG may be referred to as the second handover command/reconfiguration message, and the SCG is referred to as a cell in which the handover command/the reconfiguration message is received for the second time. In an example, information about the cell in the SCG may be denoted as last previousCellId or last previousPScellId. In some possible descriptions, that the handover command/the reconfiguration message is received for the second time may also be referred to as that the handover command/the reconfiguration message is received for the last time.

It may be understood that the handover command message or the reconfiguration message is used as an example for description herein. However, this embodiment of this application is not limited thereto. For example, the terminal device may alternatively receive, by using the SCG, any one of the reconfiguration with synchronization (reconfiguration with sync) message, the reconfiguration message including the mobility control parameter, and the like, and perform a response action based on the received message. Correspondingly, these received response messages in this case may be referred to as the second response messages or the last response messages.

In some possible embodiments, when the terminal device performs cell handover based on the second handover command, a handover failure may occur, or the handover succeeds but an RLF occurs soon. In some possible embodiments, when the terminal device attempts to reestablish a connection to the MCG based on the second reconfiguration message, a reestablishment failure may occur, or the reestablishment succeeds but an RLF occurs soon.

In these cases, the handover failure, the reestablishment failure, or the RLF may be referred to as the second connection failure or the last connection failure. In this case, the second handover command/reconfiguration message occurs before the second connection failure. In this case, the cell in which the connection fails for the second time may be a primary cell, a primary secondary cell, a special cell, or the like. This is not limited in this embodiment of this application.

In an example, if configuration of the target cell in the handover command message is inappropriate, a connection failure occurs in a process in which the terminal device is handed over to the target cell, or a connection failure occurs soon after the terminal device is handed over to the target cell. Alternatively, the terminal device attempts, based on the reconfiguration message, to reestablish a connection to the MCG, and a connection failure occurs in a reestablishment process, or a connection failure occurs soon after the reestablishment succeeds.

It should be noted that, for a case in which the terminal device may successfully send the MCG failure report to the SCG and the SCG connection failure occurs before the response message (for example, the handover command message/the reconfiguration message) is received, it may be considered that the second connection failure (or the last connection failure) occurs before the second handover command/reconfiguration message.

It should be further noted that, in this embodiment of this application, a quantity of times that a connection failure occurs is not limited. In other words, in this embodiment of this application, only one connection failure may occur. For example, the connection failure occurs in the MCG. Alternatively, two connection failures may occur. For example, a connection failure occurs in the MCG, and one more connection failure occurs in the SCG or another cell. Alternatively, in this embodiment of this application, three or more connection failures may occur. For example, a connection failure occurs on the terminal device in a source MCG, then a connection failure occurs on the terminal device in the SCG again, and a connection failure occurs on the terminal device in the MCG or the SCG after the terminal device is handed over to a target MCG.

The following describes information that the failure report may include.

Optionally, the failure report may further include information about a cell in the MCG.

Specifically, the information about the cell in the MCG is information about a cell in which the first connection failure occurs or information about a primary cell in which the first connection failure occurs. In an example, the information about the cell in the MCG may be denoted as first failedCellId or first failedPcellId. It may be understood that, the MCG herein may be the primary cell (Pcell) in the MCG or the special cell (SpCell) in the MCG. This is not limited in this embodiment of this application.

Optionally, the failure report may further include a type of the connection failure occurring in the MCG.

Specifically, the type of the connection failure occurring in the MCG is a type of the first connection failure or a connection failure type when the connection failure occurs. In an example, the type of the connection failure occurring in the MCG may be denoted as first connectionFailureType. In this embodiment of this application, a connection failure type includes an HOF or an RLF.

Optionally, the failure report may further include information about a cell to which the terminal device attempts to connect after the connection failure occurs in the MCG. Herein, the cell that attempts to be connected is a cell in which reestablishment is attempted, a cell in which handover succeeds, or a cell in which recovery succeeds. In an example, information about the cell that attempts to be connected may be denoted as connectionCellId.

Optionally, the failure report may further include information about a cell in which the terminal device receives the handover command before the connection failure occurs in the MCG, namely, information about a cell in which the handover command is received before the first connection failure occurs, or information about a cell in which the handover command is received before the connection failure occurs in the primary cell. In an example, the information may be denoted as first previousCellId.

Optionally, the failure report may further include information about a primary cell in which a connection failure occurs, where the connection failure is detected by the terminal device again after the connection failure occurs in the MCG, namely, information about a primary cell in which the second or the last connection failure occurs. In an example, the information may be denoted as last failedPcellId.

Alternatively, optionally, the failure report may further include information about a secondary cell in which a connection failure occurs, where the connection failure is detected by the terminal device again after the connection failure occurs in the MCG, namely, information about a secondary cell in which the second or the last connection failure occurs. In an example, the information may alternatively be denoted as last failedPScellId.

In a possible implementation, the failure report may not include the last failedPScellId and the last failedPcellId. In an alternative implementation, the failure report may include information about a cell in which a connection failure occurs, where the connection failure is detected by the terminal device again after the connection failure occurs in the MCG, namely, information about a cell in which the second or the last connection failure occurs. In an example, the information may be denoted as last failedCellId. In this case, in a possible implementation, the failure report may further include indication information, used to indicate whether the cell in which the second or the last connection failure occurs is a primary cell or a primary secondary cell.

Optionally, the failure report may further include time since the handover command is received before the connection failure occurs in the MCG to a time point at which the connection failure occurs in the MCG, namely, time since receiving the handover command for the first time to the first connection failure, or time since receiving the handover command to a time point at which a connection failure occurs in a primary cell for the first time. In an example, the information may be denoted as time to first ConnFailure.

Optionally, the failure report may further include time since the connection failure occurs in the MCG to a time point at which the terminal device detects, after the connection failure occurs in the MCG, that the connection failure occurs again, namely, time since the first connection failure to the second or the last connection failure. In an example, the information may be denoted as time since first connFailure to last connfailure.

Optionally, the failure report may further include time since the connection failure occurs in the MCG to a time point at which the terminal device receives the handover command message after the connection failure occurs in the MCG, namely, time since the first connection failure to receiving the handover command message for the second time or the last time. In an example, the information may be denoted as time Since first connFailure to last HO CMD.

It should be noted that, in this embodiment of this application, if the second (or the last) connection failure occurs after the second (or the last) handover command message is received, the time since the first connection failure to the second (or the last) handover command message may be recorded. In other words, time since the first connection failure to an event that occurs first in that the second (or the last) handover command message is received and the second (or the last) connection failure is recorded.

Optionally, the failure report may further include time since the terminal device receives the handover command message after the connection failure occurs in the MCG to a time point at which the terminal device detects, after the connection failure occurs in the MCG, that the connection failure occurs again, namely, time since receiving a handover command for the second time to the second connection failure, or time since receiving the handover command message for the last time to the last connection failure. In an example, the information may be denoted as time since last HO CMD to last connfailure.

In this case, the terminal device may first receive the handover command message, and then the second (or the last) connection failure occurs on the terminal device.

Optionally, the failure report may further include time since the terminal device detects one more connection failure after the connection failure occurs in the MCG, namely, time since detecting the second connection failure or the last connection failure. In an example, the time may be denoted as time since last connfailure. For example, the time usually refers to time since detecting the second connection failure or the last connection failure to sending the failure report to a network device.

Optionally, the failure report may further include time since the terminal device receives the handover command after the terminal device detects that the connection failure occurs in the master cell group MCG, namely, time since detecting that the handover command message is received for the second time or the last handover command message is received. In an example, the time may be denoted as time since last HO CMD. For example, the time usually refers to time since detecting that a handover command is received for the second time or the last handover command is received to sending the failure report to the network device.

Optionally, the failure report may further include time since the connection failure occurs in the MCG, namely, time since the first connection failure. The time is usually time since the first connection failure to reporting the failure report to the network device. Alternatively, the time may also be referred to as time since the first connection failure of a primary cell. In an example, the time may be denoted as time since first connfailure.

Optionally, the failure report may further include a type of the connection failure that occurs again and that is detected by the terminal device after the connection failure occurs in the MCG, namely, a type of the second connection failure or the last connection failure. In some implementations, a type of the connection failure includes an RLF or an HOF. In an example, the type of the connection failure may be denoted as last connectionFailureType.

It may be understood that the handover command message is used as an example for description above. However, this embodiment of this application is not limited to the message. For example, the handover command message may be further replaced with any one of the reconfiguration message, the reconfiguration with synchronization (reconfiguration with sync) message, and the reconfiguration message including the mobility control parameter.

Specifically, for description of the cell information, refer to descriptions in another embodiment of this application. Details are not described herein again.

520: The terminal device sends the failure report to a first access network device.

The first access network device may be a network device to which a serving cell in which the terminal device enters a connected mode belongs. For example, the first access network device may be a network device to which a cell in which the terminal device attempts to reestablish a connection belongs, or may be a network device to which another cell belongs. In some possible embodiments, the first access network device may be a target primary access network device, a source primary access network device, or the like. This is not limited in this embodiment of this application.

In an example, the first access network device may be a network device to which a cell in which the terminal device successfully performs connection reestablishment belongs, for example, a node to which a cell in which connection reestablishment is attempted in FIG. 3 or FIG. 4 belongs.

530: The first access network device determines, based on the failure report, a cell in which the connection failure occurs.

In an example, the cell in which a connection fails includes a cell in which a connection fails for the first time and/or a cell in which a connection fails for the second time.

Therefore, in this embodiment of this application, because the failure report includes the information about the cell in the SCG in which master cell group MCG connection recovery is attempted when the terminal device detects that the connection failure occurs in the MCG, the failure report can assist an access network device in determining a cell in which a connection failure occurs in a handover process, so that the access network device better adjusts a handover-related parameter, or the access network device is assisted in configuring a related parameter.

Optionally, when an access network device to which the cell in which the connection failure occurs belongs is the first access network device, the first access network device adjusts the handover-related parameter based on the failure report.

Optionally, 540: When the access network device to which the cell in which the connection failure occurs belongs is a second access network device, the first access network device may further send a failure indication to the second access network device, where the failure indication includes the failure report. Correspondingly, the second access network device receives the failure indication sent by the first access network device, and determines, based on the failure indication, an access network device that causes the connection failure.

In an example, when the first access network device is the target primary access network device, the second access network device may be a source primary access network device. In another example, when the first access network device is the source primary access network device, the second access network device may be a target primary access network device.

Optionally, when the second access network device determines that the access network device that causes the connection failure is the second access network device, the second access network device may adjust the handover-related parameter based on the failure report.

Optionally, 550: When the second access network device determines that the access network device that causes the connection failure is another access network device (for example, a third access network device), the second access network device may send a first report to the third access network device, where the first report includes the failure report. Then, the third access network device may adjust the handover-related parameter based on the failure report.

In an example, the first access network device may be a first target primary access network device, the second access network device may be a second target primary access network device, and the third access network device may be a source primary access network device. In another example, the first access network device and the third access network device may be a same source primary access network device, and the second access network device may be a target primary access network device.

In an example, the first report may be an HO report, but this embodiment of this application is not limited thereto.

Optionally, the first access network device may send the failure indication to an access network device to which the SCG belongs, and then the access network device to which the SCG belongs sends the failure indication to an access network device, namely, the second access network device, to which the MCG belongs. This is not limited in this embodiment of this application.

Optionally, the second access network device may send the first report to an access network device to which the SCG belongs, and then the access network device to which the SCG belongs sends the first report to an access network device, namely, the third access network device, to which the MCG belongs. This is not limited in this embodiment of this application.

With reference to FIG. 6 to FIG. 13, an example in which a primary access device is a master node MN, a secondary access network device is a secondary node SN, and a terminal device is UE is used for description below. For an implementation method of a chip in the master node MN, a chip in the secondary node SN, and a chip in the UE, refer to specific descriptions of the master node MN, the secondary node SN, and the UE. Details are not described again.

Figure 6:
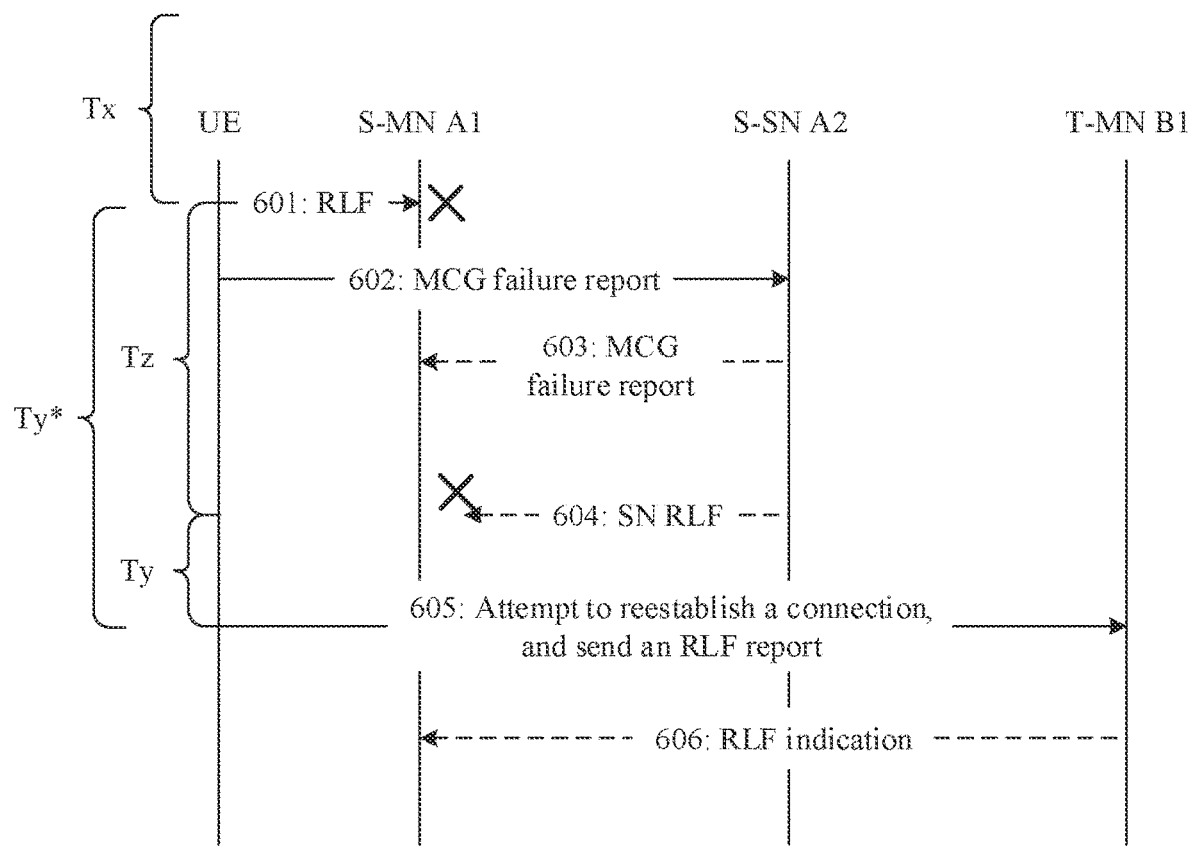
FIG. 6 is a schematic flowchart of a communication method according to an embodiment of this application.

FIG. 6 is a schematic flowchart of a communication method according to an embodiment of this application. In FIG. 6, UE is used as an example of the terminal device in FIG. 5, an access network device to which a T-MN B1 belongs is used as an example of the first access network device in FIG. 5, and an access network device to which an S-MN A1 belongs is described as an example of the second access network device in FIG. 5.

In an example, the UE in FIG. 6 is configured as DC on a source access network device side, and the communication method in FIG. 6 corresponds to a scenario of a too late HO.

601: An RLF occurs on the UE in a source primary cell A1 (denoted as the S-MN A1). That is, the RLF occurs on the UE in an MCG of the S-MN A1.

According to an MCG fast recovery mechanism in an R16 protocol, the UE can recover the MCG by using a source secondary cell A2 (denoted as S-SN A2). In an example, the UE may perform the following steps 602 and 603 to attempt MCG fast recovery.

602: The UE sends an MCG failure report to the S-SN A2.

603: The S-SN A2 sends the MCG failure report to the S-MN A1. 604: In an MCG recovery process, the UE detects the RLF in the S-SN A2.

605: The UE attempts to reestablish a connection in a target primary cell B1 (denoted as the T-MN B1), and sends an RLF report.

In an example, the UE may successfully perform reestablishment in the T-MN B1. To enable the S-MN A1 to appropriately adjust a handover parameter, the UE needs to record cell information experienced in a process from detecting the RLF (namely, the RLF in 601) for the first time to attempting reestablishment and time information.

In an example, for the scenario in FIG. 6, information elements recorded by the UE are as follows.

(1) first failedCellId: A1.

(2) first connectionFailureType: the RLF.

(3) first previousCellId: not exist.

In this embodiment, the UE receive no handover command before accessing A1, and therefore does not need to record the information element (3). It may be understood that, if the UE receives a handover command in a cell S and is handed over to A1, the UE may record the information element (3) as S.

(4) last failedCellId: A2.

Optionally, indication information may be further included, and is used to indicate that the cell is a primary secondary cell. Alternatively, it may be recorded as (4') last failedPScellId: A2.

(5) last connectionFailureType: the RLF.

(6) last previousCellId: not exist.

Because of a cell in which the UE receives no handover command or reconfiguration message after detecting that the RLF occurs in A1, the information element (6) does not need to be recorded.

(7) connectionCellId: B1, a cell in which reestablishment is attempted.

(8) time to first ConnFailure: Tx.

In this embodiment of this application, an example in which the UE receives no handover command before accessing the S-MN A1 is used. In this case, the information element (8) is not recorded or is set to a maximum value.

If the UE receives the handover command in the cell S and is handed over to the S-MN A1, the UE may record the information element (8) as time since receiving the handover command from the cell S to a time point at which a connection failure occurs in the S-MN A1.

(9) time Since first connFailure to last connfailure: Tz, time since an S-MN A1 connection failure (namely, 601) to an S-SN A2 connection failure (namely, 604).

(10) time since last HO CMD to last connfailure: not exist.

(11) time since last connfailure: Ty, time since the S-SN A2 connection failure (namely, 604).

Alternatively, the foregoing information elements (9) to (11) may be replaced with the following information element (9)*.

(9)* time since first failure: Ty*, time since detecting that the connection failure (namely, 601) occurs in the S-MN A1.

For example, the UE sends the RLF report to the T-MN B1, where the RLF report includes the foregoing information elements recorded by the UE.

For example, the UE may enable at least one of the foregoing information elements (1) to (11) to be included in the RLF report. In other words, an information element in the RLF report of the terminal device may be equal to or less than the information elements recorded by the UE. It may be understood that the foregoing information elements (1) to (11) are merely an example, and the terminal device may record at least one of the foregoing information elements, or may record an information element other than the foregoing information elements.

606: After receiving the RLF report, the T-MN B1 determines, based on the information element (1) first failedCellId: A1 in the RLF report, that an RLF indication needs to be sent to the S-MN A1, where the RLF indication carries the RLF report. For details of the RLF indication, refer to the foregoing description. Details are not described herein again.

Alternatively, after receiving the RLF report, the T-MN B1 sends an RLF indication to the S-SN A2 based on the last failedCellId, and the S-SN A2 further sends the RLF indication to the S-MN A1 based on the first failedCellId.

The S-MN A1 may appropriately adjust the handover parameter according to the received RLF indication.

Figure 7:
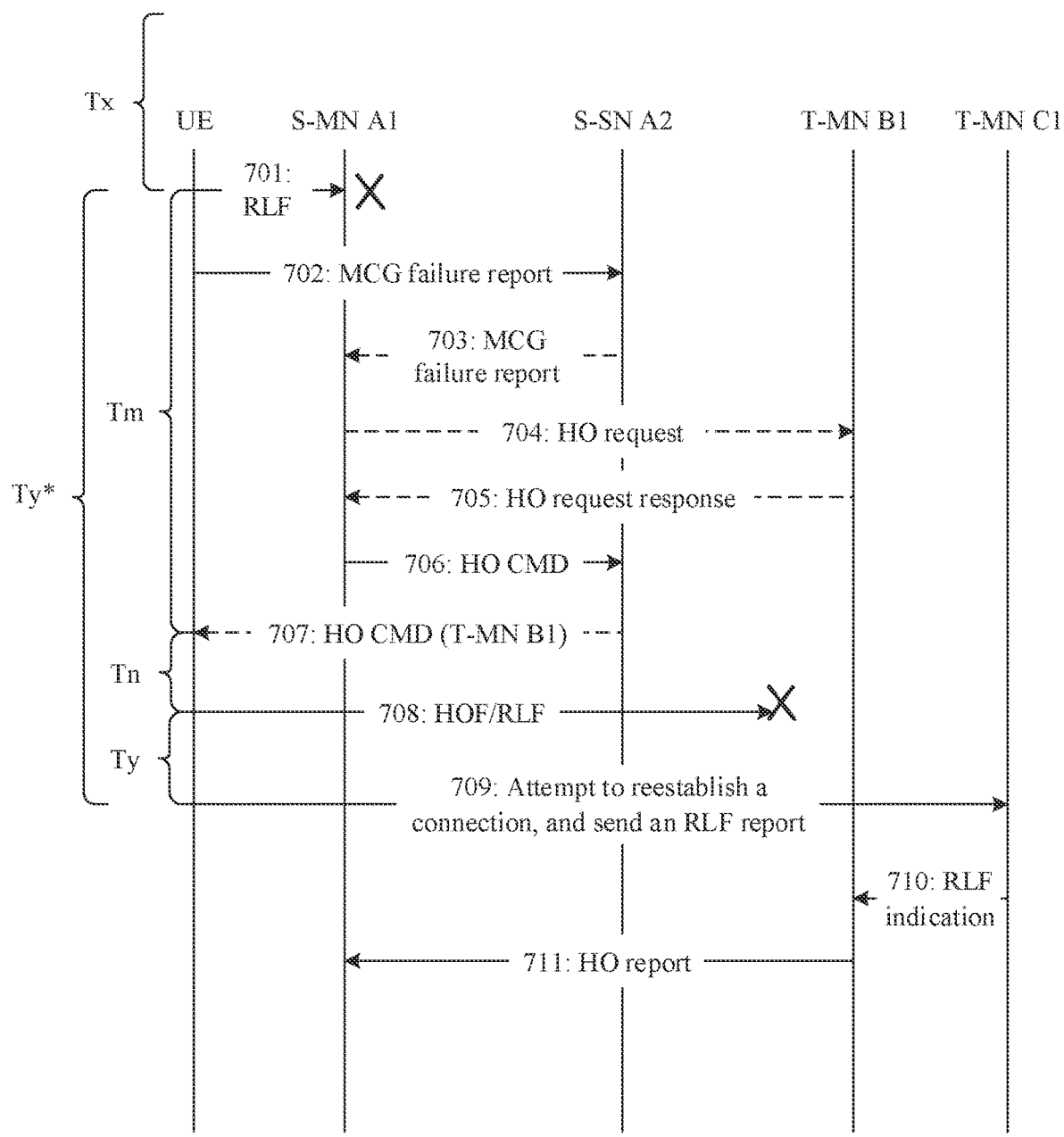
FIG. 7 is a schematic flowchart of another communication method according to an embodiment of this application.

FIG. 7 is a schematic flowchart of a communication method according to an embodiment of this application. In FIG. 7, UE is used as an example of the terminal device in FIG. 5, an access network device to which a T-MN C1 belongs is used as an example of the first access network device in FIG. 5, an access network device to which a T-MN B1 belongs is used as an example of the second access network device in FIG. 5, and an access network device to which an S-MN A1 belongs is used as an example of the third access network device in FIG. 5 for description.

In an example, the UE in FIG. 7 is configured as DC on a source access network device side, and the communication method in FIG. 7 corresponds to scenarios of a too late HO and an HO to wrong cell.

701: An RLF occurs on the UE in the S-MN A1. That is, the RLF occurs on the UE in an MCG of the S-MN A1.

702: The UE sends an MCG failure report to an S-SN A2.

703: The S-SN A2 sends the MCG failure report to the S-MN A1.

Specifically, for 701 to 703, refer to descriptions in 601 to 603 in FIG. 6. For brevity, details are not described herein again.

704: The S-MN A1 sends an HO request (HO request) to the T-MN B1.

705: The T-MN B1 sends an HO request acknowledgement (HO request ACK) to the S-MN A1.

706: The S-MN A1 sends a handover command (HO CMD) to an S-MN A2.

707: The S-MN A1 sends, to the UE, a handover command for handover to the T-MN B1. Correspondingly, the UE successfully receives the handover command. In an example, the handover command may be denoted as the HO CMD (T-MN B1).

Specifically, although quality of the S-MN A1 is poor, quality of the S-MN A2 is relatively good, so that the UE successfully receives the handover command. Because the UE receives a handover command sent by an SCG, the UE may consider that the MCG is recovered successfully, that is, the UE successfully recovers a connection between the UE and the MCG by using the SCG.

708: The UE does not complete a handover in the T-MN B1, or the RLF occurs soon after the handover is completed.

In an example, if the T-MN B1 of a target cell is inappropriately configured, the UE may not complete the handover in T-MN B1, or the RLF occurs soon after the handover is completed.

709: The UE attempts to reestablish a connection in a target primary cell C1 (denoted as the T-MN C1), and sends an RLF report.

In an example, the UE may successfully perform reestablishment in the T-MN C1.

To enable the S-MN A1 to appropriately adjust a handover parameter, the UE needs to record cell information experienced in a process from detecting the RLF (namely, the RLF in 701) for the first time to attempting reestablishment and time information.

In an example, for the scenarios in FIG. 7, information elements recorded by the UE are as follows.

(1) first failedCellId: A1.

(2) first connectionFailureType: the RLF.

(3) first previousCellId: not exist.

(4) last failedCellId: B1.

Optionally, indication information may be further included, and is used to indicate that the cell is a primary cell. Alternatively, it may be recorded as (4') last failedPcellId: B1.

(5) last connectionFailureType: an HOF/the RLF.

(6) last previousCellId: A2.

(7) connectionCellId: C1.

(8) time to first ConnFailure: Tx.

If there is no handover command before A1, the information element (8) is not recorded or is set to a maximum value.

(9) time Since first connFailure to last HO CMD: Tm, time since the first connection failure (namely, 701) to the last handover command (namely, 707).

(10) time since last HO CMD to last connfailure: Tn, time since the last handover command (namely, 707) to the last connection failure (namely, 708).

(11) time since last connfailure: Ty, time since the last connection failure (namely, 708).

Alternatively, the foregoing information elements (9) to (11) may be replaced with the following information element (9)*.

(9)* time since first connfailure: Ty*, time since detecting that the connection failure (namely, 701) occurs in the S-MN A1.

Specifically, for the information elements (1) to (11), refer to the foregoing descriptions in FIG. 6 and/or the embodiments of this application. For brevity, details are not described herein again.

For example, the UE sends the RLF report to the T-MN C1, where the RLF report includes the foregoing information elements recorded by the UE.

710: After receiving the RLF report, the T-MN C1 determines, based on the information element (4) last failedCellId: B1 in the RLF report, that an RLF indication needs to be sent to the T-MN B1, where the RLF indication carries the RLF report.

711: B1 determines, based on the RLF report, that a handover error occurs, and B1 sends an HO report to the S-MN A1.

The S-MN A1 may appropriately adjust the handover parameter based on the received HO report.

Figure 8:
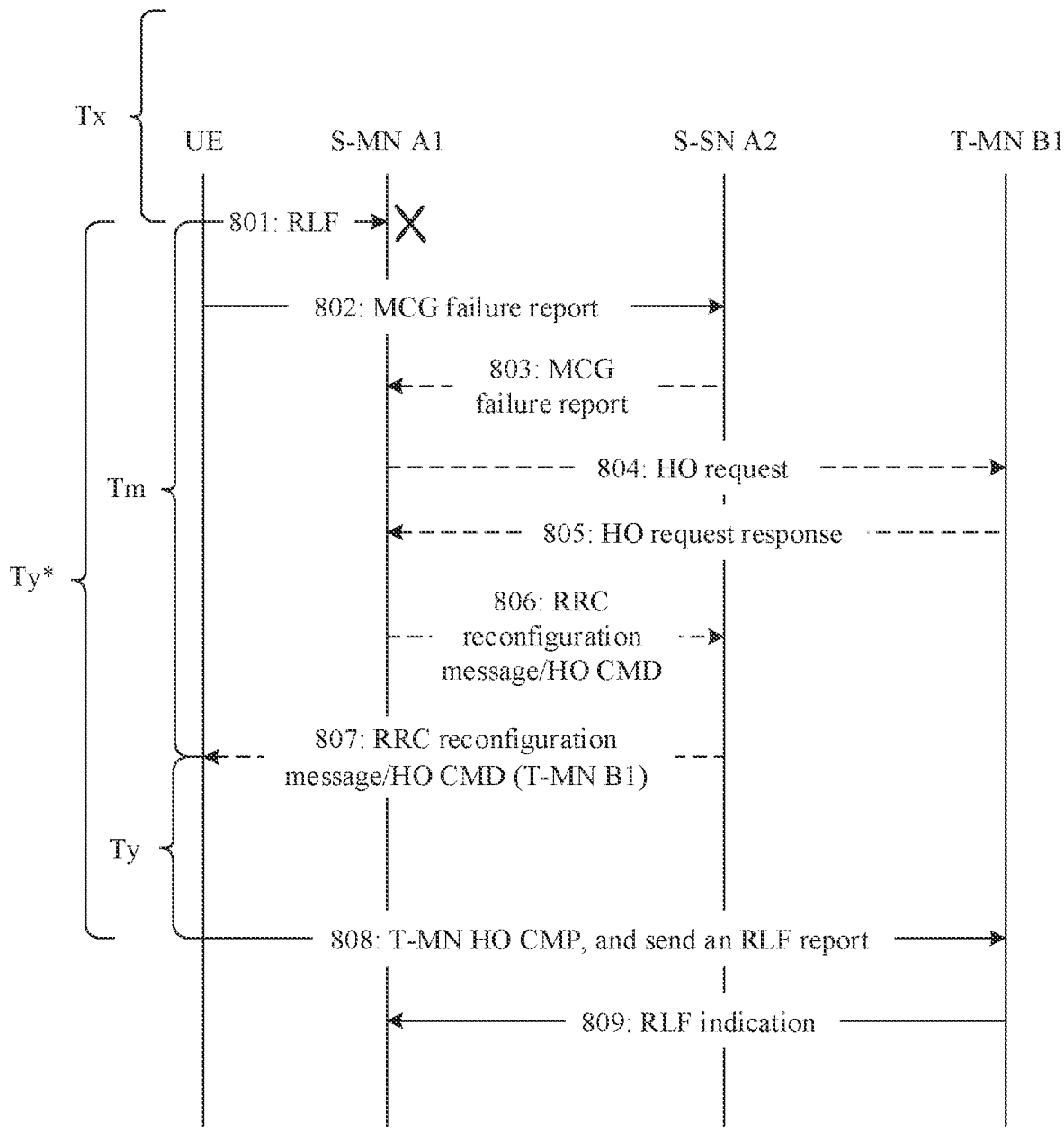
FIG. 8 is a schematic flowchart of another communication method according to an embodiment of this application.

FIG. 8 is a schematic flowchart of a communication method according to an embodiment of this application. In FIG. 8, UE is used as an example of the terminal device in FIG. 5, an access network device to which a T-MN B1 belongs is used as an example of the first access network device in FIG. 5, and an access network device to which an S-MN A1 belongs is described as an example of the second access network device in FIG. 5.

In an example, the UE in FIG. 8 is configured as DC on a source access network device side, and the communication method in FIG. 8 corresponds to a scenario of a too late HO and being handed over to a correct target cell.

801: An RLF occurs on the UE in the S-MN A1. That is, the RLF occurs on the UE in an MCG of the S-MN A1.

802: The UE sends an MCG failure report to an S-SN A2.

803: The S-SN A2 sends the MCG failure report to the S-MN A1.

804: The S-MN A1 sends an HO request to the T-MN B1.

805: The T-MN B1 sends an HO request acknowledgement (HO request ACK) to the S-MN A1.

Specifically, for 801 to 805, refer to descriptions in 701 to 705 in FIG. 7. For brevity, details are not described herein again.

806: The S-MN A1 sends an RRC reconfiguration message (RRC recfg)/a handover command (HO CMD) to an S-MN A2.

807: The S-MN A2 sends, to the UE, the RRC reconfiguration message (RRC recfg)/the handover command for handover to the T-MN B1. Correspondingly, the UE successfully receives the RRC reconfiguration message (RRC recfg)/the handover command. In an example, the handover command may be denoted as the HO CMD (T-MN B1).

Specifically, although quality of the S-MN A1 is poor, quality of the S-MN A2 is relatively good, so that the UE successfully receives the handover command. Because the UE receives a handover command sent by an SCG, the UE may consider that the MCG is recovered successfully, that is, the UE successfully recovers a connection between the UE and the MCG by using the SCG.

808: The UE completes a handover in the T-MN B1, sends a handover complete message (T-MN HO CMP) to the T-MN B1, and sends an RLF report.

Specifically, when the T-MN B1 of a target cell is appropriately configured, the UE may complete a handover in the target cell, and no connection failure occurs.

However, this is still a too late handover for the S-MN A1. Therefore, even if the UE is successfully handed over in the T-MN B1, to enable the S-MN A1 to appropriately adjust a handover parameter, the UE needs to record cell information experienced in a process from detecting the RLF (namely, the RLF in 801) for the first time to attempting reestablishment and time information.

In an example, for the scenario in FIG. 8, information elements recorded by the UE are as follows.

(1) first failedCellId: A1.

(2) first connectionFailureType: the RLF.

(3) first previousCellId: not exist.

(4) last failedCellId: not exist or set to A1.

(5) last connectionFailureType: not exist or set to be the RLF.

(6) last previousCellId: A2, information about a cell in which a handover command is received for the last time.

(7) connectionCellId: B1, a cell in which the handover is successful.

(8) time to first ConnFailure: Tx.

If there is no handover command before A1, the information element (8) is not recorded or is set to a maximum value.

(9) time Since first connFailure to last HO CMD: Tm, time since the first connection failure (namely, 801) to receiving the last handover command (namely, 807).

(10) time since last HO CMD to last connfailure: not exist.

(11) time since last HO CMD: Ty, time since receiving the last handover command (namely, 807).

Alternatively, the foregoing information elements (9) to (11) may be replaced with the following information element (9)*.

(9)* time since first connfailure: Ty*, time since detecting that the connection failure (namely, 801) occurs in the S-MN A1.

Specifically, for the information elements (1) to (11), refer to the descriptions in FIG. 6. For brevity, details are not described herein again.

For example, the UE sends the RLF report to the T-MN B1, where the RLF report includes the foregoing information elements recorded by the UE.

809: After receiving the RLF report, the T-MN B1 determines, based on the information element (1) first failedCellId: A1 or (4) last failedCellId: A1 in the RLF report, that is, based on information about a cell in which the first or the last connection failure occurs, that an RLF indication needs to be sent to the S-MN A1, where the RLF indication carries the RLF report. For details of the RLF indication, refer to the foregoing description. Details are not described herein again.

The S-MN A1 may appropriately adjust the handover parameter according to the received RLF indication.

Figure 9:
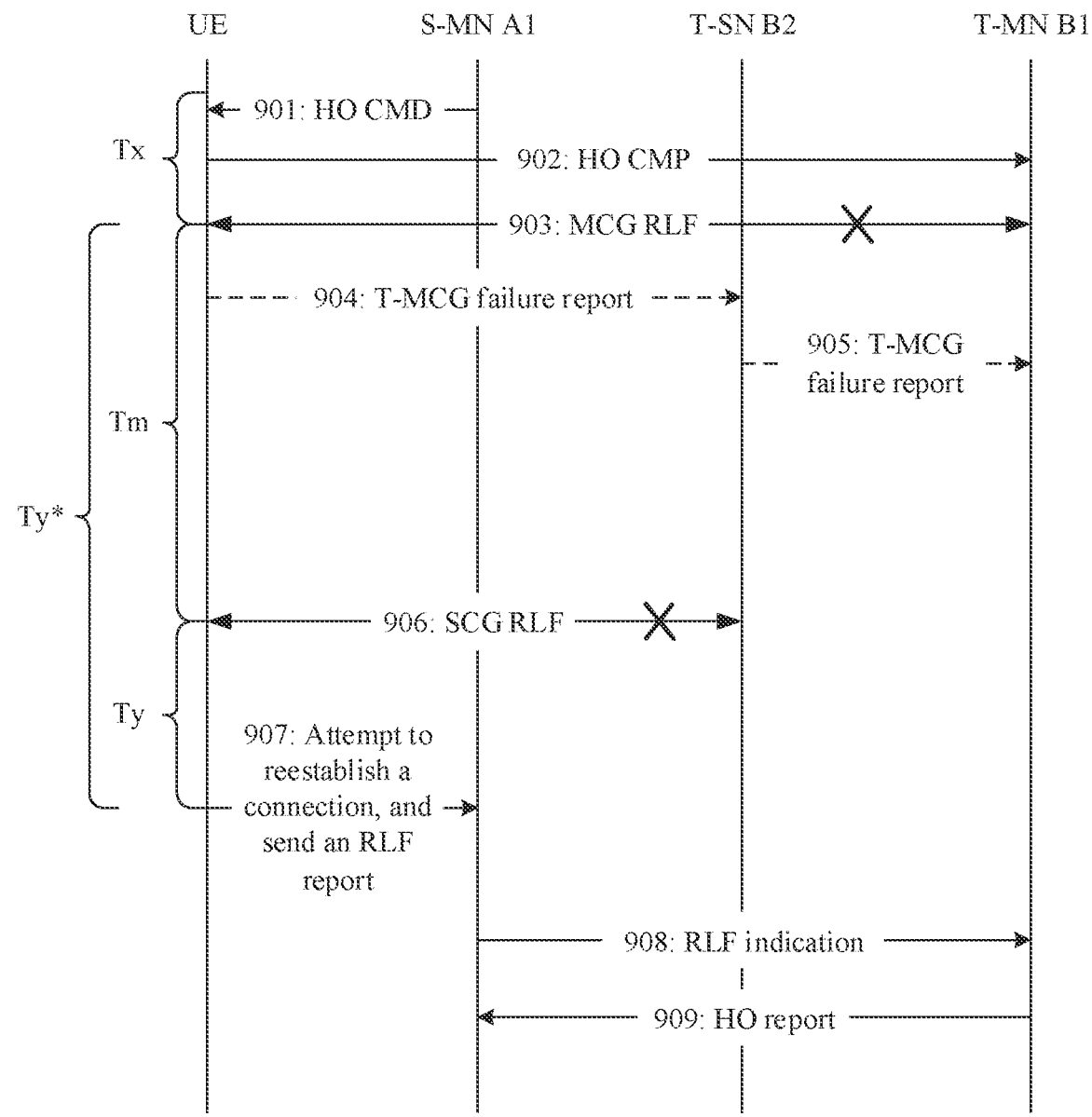
FIG. 9 is a schematic flowchart of another communication method according to an embodiment of this application.

FIG. 9 is a schematic flowchart of a communication method according to an embodiment of this application. In FIG. 9, UE is used as an example of the terminal device in FIG. 5, an access network device to which an S-MN A1 belongs is used as an example of the first access network device in FIG. 5, an access network device to which a T-MN B1 belongs is used as an example of the second access network device in FIG. 5, and the access network device to which the S-MN A1 belongs is used as an example of the third access network device in FIG. 5 for description. That is, the first access network device and the third access network device are a same access network device.

In an example, the UE in FIG. 9 is configured as DC on a target access network device side, and the communication method in FIG. 9 corresponds to a scenario of a too early HO.

901: The UE receives an HO CMD in the S-MN A1.

902: The UE completes a handover in the T-MN B1, and sends the HO CMP to the T-MN B1.

903: An RLF occurs on the UE in an MCG of the T-MN B1 soon after 902.

Alternatively, 902 and 903 may be replaced with that the UE does not complete a handover in the T-MN B1, that is, in a process of handover of the UE to the T-MN B1, an HOF occurs on the UE. The following uses 902 and 903, that is, the UE completes the handover in the T-MN B1, but an MCG T-MN B1 RLF occurs soon, as an example for description.

Based on an MCG fast recovery mechanism, the UE may recover the MCG by using a target secondary cell B2 (denoted as T-SN B2). In an example, the UE may perform the following steps 904 and 905 to attempt MCG fast recovery.

904: The UE sends an MCG failure report to the T-SN B2.

905: The T-SN B2 sends the MCG failure report to the T-MN B1.

906: In an MCG recovery process, the UE detects, in the T-SN B2, that an RLF occurs, that is, detects an SCG RLF.

In an example, in the MCG recovery process, the UE detects the RLF in the T-SN B2 because addition of the T-SN B2 is also inappropriate.

907: The UE attempts to reestablish a connection in the S-MN A1, and sends an RLF report.

In an example, the UE may successfully perform reestablishment in the S-MN A1.

To enable the S-MN A1 to appropriately adjust a handover parameter, the UE needs to record cell information experienced in a process from detecting the RLF (namely, the RLF in 903) for the first time to attempting reestablishment and time information. In addition, all information recorded by the UE also helps the T-MN B1 to identify that addition of the T-SN B2 is inappropriate, to perform appropriate parameter adjustment.

In an example, for the scenario in FIG. 9, information elements recorded by the UE are as follows.

(1) first failedCellId: B1.
(2) first connectionFailureType: the RLF.
(3) first previousCellId: A1.
(4) last failedCellId: B2.

Optionally, indication information may be further included, and is used to indicate that the cell is a primary secondary cell. Alternatively, it may be recorded as (4') last failedPScellId: B2.

(5) last connectionFailureType: the RLF.
(6) last previousCellId: not exist.
(7) connectionCellId: A1, a cell in which reestablishment is attempted.
(8) time to first ConnFailure: Tx, time since receiving the first HO command (namely, 901) to a time point at which the connection failure occurs in the T-MN B1 (namely, 903).
(9) time Since first connFailure to last connfailure: Tm, time since a T-MN B1 connection failure (namely, 903) to a T-SN B2 connection failure (namely, 906).
(10) time since last HO CMD to last connfailure: not exist.
(11) time since last connfailure: Ty, time since detecting the T-SN B2 connection failure (namely, 906).

Alternatively, the foregoing information elements (9) to (11) may be replaced with the following information element (9)*.

(9)* time since first failure: Ty*, time since detecting that the connection failure (namely, 903) occurs in the T-MN B1.

Specifically, for the information elements (1) to (11), refer to the descriptions in FIG. 6. For brevity, details are not described herein again.

For example, the UE sends the RLF report to the S-MN A1, where the RLF report includes the foregoing information elements recorded by the UE.

Optionally, 908: After receiving the RLF report, the S-MN A1 determines, based on a historical handover record and the information element (1) first failedCellId: B1 in the RLF report, that an RLF indication needs to be sent to the T-MN B1, where the RLF indication carries the RLF report. For details of the RLF indication, refer to the foregoing description. Details are not described herein again.

The T-MN B1 may determine, based on the RLF report, that an addition parameter of T-SN B2 is inappropriately configured, and performs appropriate parameter adjustment.

Optionally, 909: The T-MN B1 may further determine, based on the RLF report, that a too early HO from the S-MN A1 to the T-MN B1 occurs, and B1 sends an HO report to the S-MN A1.

The S-MN A1 may appropriately adjust the handover parameter according to the received RLF indication.

It may be understood that the S-MN A1 may also determine, based on the received RLF indication and the historical handover record, that the too early HO from the S-MN A1 to the T-MN B1 occurs.

Figure 10:
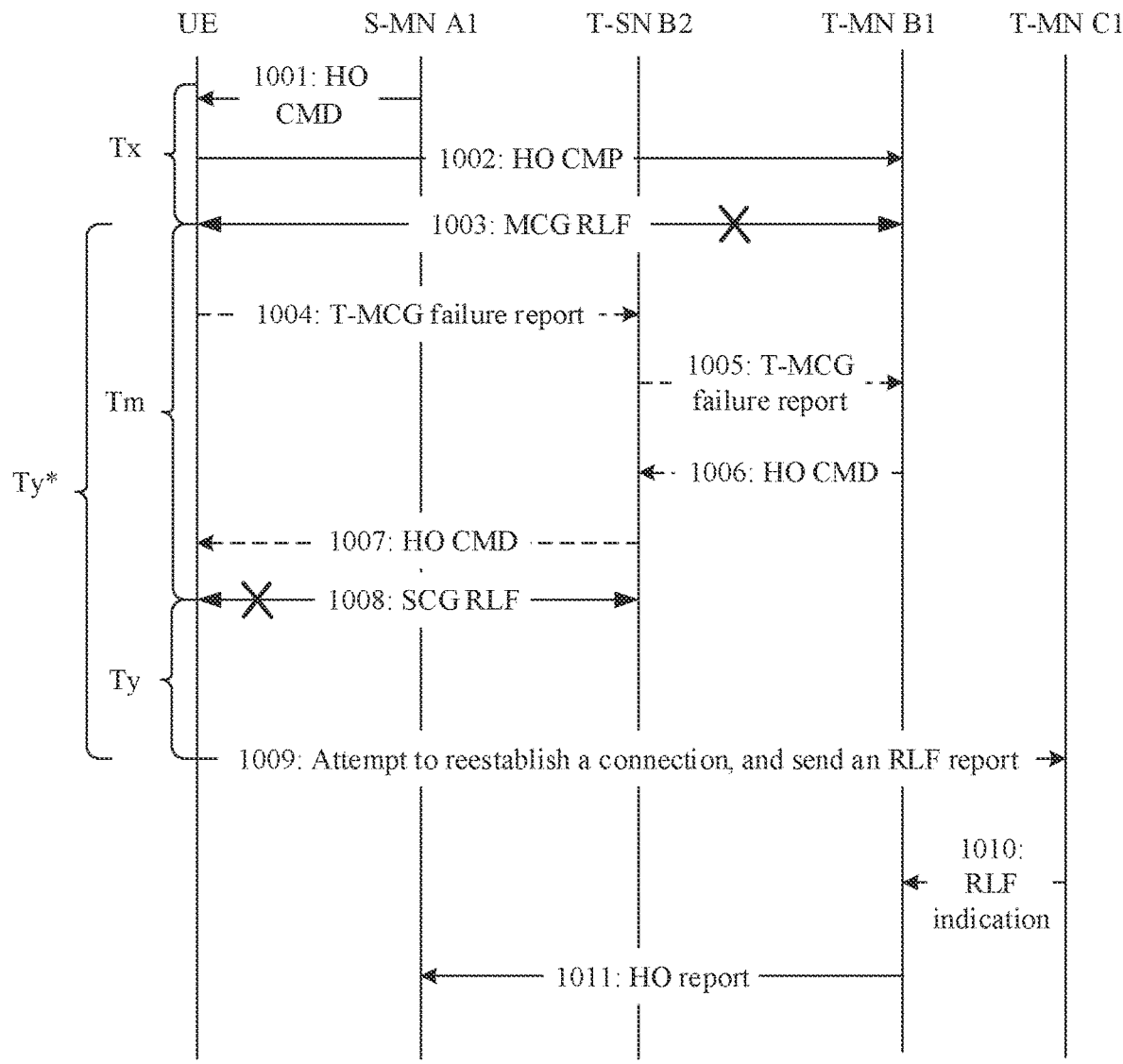
FIG. 10 is a schematic flowchart of another communication method according to an embodiment of this application.

FIG. 10 is a schematic flowchart of a communication method according to an embodiment of this application. In FIG. 10, UE is used as an example of the terminal device in FIG. 5, an access network device to which a T-MN C1 belongs is used as an example of the first access network device in FIG. 5, an access network device to which a T-MN B1 belongs is used as an example of the second access network device in FIG. 5, and an access network device to which an S-MN A1 belongs is used as an example of the third access network device in FIG. 5 for description.

In an example, the UE in FIG. 10 is configured as DC on a target access network device side, and the communication method in FIG. 10 corresponds to a scenario of an HO to wrong cell.

1001: The UE receives an HO CMD in the S-MN A1.

1002: The UE completes a handover in the T-MN B1, and sends the HO CMP to the T-MN B1.

1003: An RLF occurs on the UE in an MCG of the T-MN B1 soon after 1002.

It may be understood that, in this embodiment, an example in which an RLF occurs on the UE soon after the handover is successfully completed in the T-MN B1 is used for description, and operations in steps 1002 and 1003 need to be performed. If the UE fails in a handover process in the T-MN B1, the UE detects an HOF. Steps 1002 and 1003 may be replaced with step 1002': The UE determines that an SCG HOF occurs in the T-MN B1. The following uses 1002 and 1003, that is, the UE completes the handover in the T-MN B1, but an MCG RLF occurs soon in the T-MN B1, as an example for description.

1004: The UE sends an MCG failure report to a T-SN B2.

1005: The T-SN B2 sends the MCG failure report to the T-MN B1.

Specifically, for 1001 to 1005, refer to descriptions in 901 to 905 in FIG. 9. For brevity, details are not described herein again.

1006: The T-MN B1 sends an HO CMD to the T-SN B2.

1007: The T-SN B2 sends the HO CMD to the UE.

1008: The UE detects no HO CMD. In this case, the UE determines that an SCG RLF occurs in the T-SN B2.

In other words, in this case, although the T-SN B2 sends the HO CMD to the UE, the UE does not successfully receive the HO CMD, and it is still that an RLF occurs in an SCG.

It may be understood that, in this embodiment, an example in which the UE successfully sends the MCG failure report in the T-SN B2 is used for description, and operations in steps 1004 to 1008 need to be performed. If the UE sends no MCG failure report in the T-SN B2, the UE may directly consider that an RLF occurs in the T-SN B2. That is, steps 1004 to 1008 may be replaced with step 1004'. The UE determines that the SCG RLF occurs in the T-SN B2.

1009: The UE attempts to reestablish a connection in the T-MN C1, and sends an RLF report.

In an example, because the S-MN A1 selects a correct target cell, the UE selects the target T-MN C1 after 1008 and attempts to reestablish a connection in the target T-MN C1. In an example, the UE may successfully perform reestablishment in the T-MN C1.

To enable the S-MN A1 to appropriately adjust a handover parameter, the UE needs to record cell information experienced in a process from detecting the RLF (namely, the RLF in 1003) for the first time to attempting reestablishment and time information. In addition, all information recorded by the UE also helps the T-MN B1 to identify that addition of the T-SN B2 is inappropriate, to perform appropriate parameter adjustment.

In an example, for the scenario in FIG. 10, information elements recorded by the UE are as follows.

(1) first failedCellId: B1.

(2) first connectionFailureType: the RLF.

(3) first previousCellId: A1.

(4) last failedCellId: B2.

Optionally, indication information may be further included, and is used to indicate that the cell is a primary secondary cell. Alternatively, it may be recorded as (4') last failedPScellId: B2.

(5) last connectionFailureType: the RLF.

(6) last previousCellId: not exist.

(7) connectionCellId: C1, a cell in which reestablishment is attempted.

(8) time to first ConnFailure: Tx, time since receiving the first HO command (namely, 1001) to a time point at which the connection failure occurs in the T-MN B1 (namely, 1003).

(9) time Since first connFailure to last connfailure: Tm, time since a T-MN B1 connection failure (namely, 1003) to a T-SN B2 connection failure (namely, 1008).

(10) time since last HO CMD to last connfailure: not exist. [Time since receiving the last handover command to the last connection failure.]

(11) time since last connfailure: Ty, time since detecting the T-SN B2 connection failure (namely, 1008).

Alternatively, the foregoing information elements (9) to (11) may be replaced with the following information element (9)*.

(9)* time since first failure: Ty*, time since detecting that the connection failure (namely, 1003) occurs in the T-MN B1.

Specifically, for the information elements (1) to (11), refer to the descriptions in FIG. 6. For brevity, details are not described herein again.

For example, the UE sends the RLF report to the T-MN C1, where the RLF report includes the foregoing information elements recorded by the UE.

In an implementation, 1010: After the T-MN C1 receives the RLF report, if the information element (4) last failedCellId in the RLF report is information about a primary secondary cell in which a connection failure occurs, T-MN C1 determines, based on the information element (1) first failedCellId: B1 in the RLF report, that an RLF indication needs to be sent to the T-MN B1, where the RLF indication carries the RLF report. For details of the RLF indication, refer to the foregoing description. Details are not described herein again.

The T-MN B1 may determine, based on the RLF report, that an addition parameter of T-SN B2 is inappropriately configured, and perform appropriate parameter adjustment.

Optionally, 1011: The T-MN B1 may further determine, based on the RLF report, that a too early HO from the S-MN A1 to the T-MN B1 occurs, and the T-MN B1 sends an HO report to the S-MN A1.

Alternatively, in another implementation, after the T-MN C1 receives the RLF report, the T-MN C1 may determine, based on the information element (4) last failedCellId: B2 in the RLF report, that the RLF indication needs to be sent to the T-SN B2. For example, if the information element (4) last failedCellId in the RLF report, the T-MN C1 cannot determine whether a cell in which a connection failure occurs is a primary cell or a secondary cell. In this case, the T-MN C1 may send the RLF indication to the T-SN B2. The T-SN B2 determines, based on the RLF report in the RLF indication, to send the RLF report to the T-MN B1.

The T-MN B1 may determine, based on the RLF report, that an addition parameter of T-SN B2 is inappropriately configured, and perform appropriate parameter adjustment.

Optionally, the T-MN B1 may further determine, based on the RLF report, that an HO to wrong cell from the S-MN A1 to the T-SN B1 occurs, and the T-MN B1 sends the HO report to the S-MN A1.

The S-MN A1 may appropriately adjust the handover parameter based on the received HO report.

Figure 11:
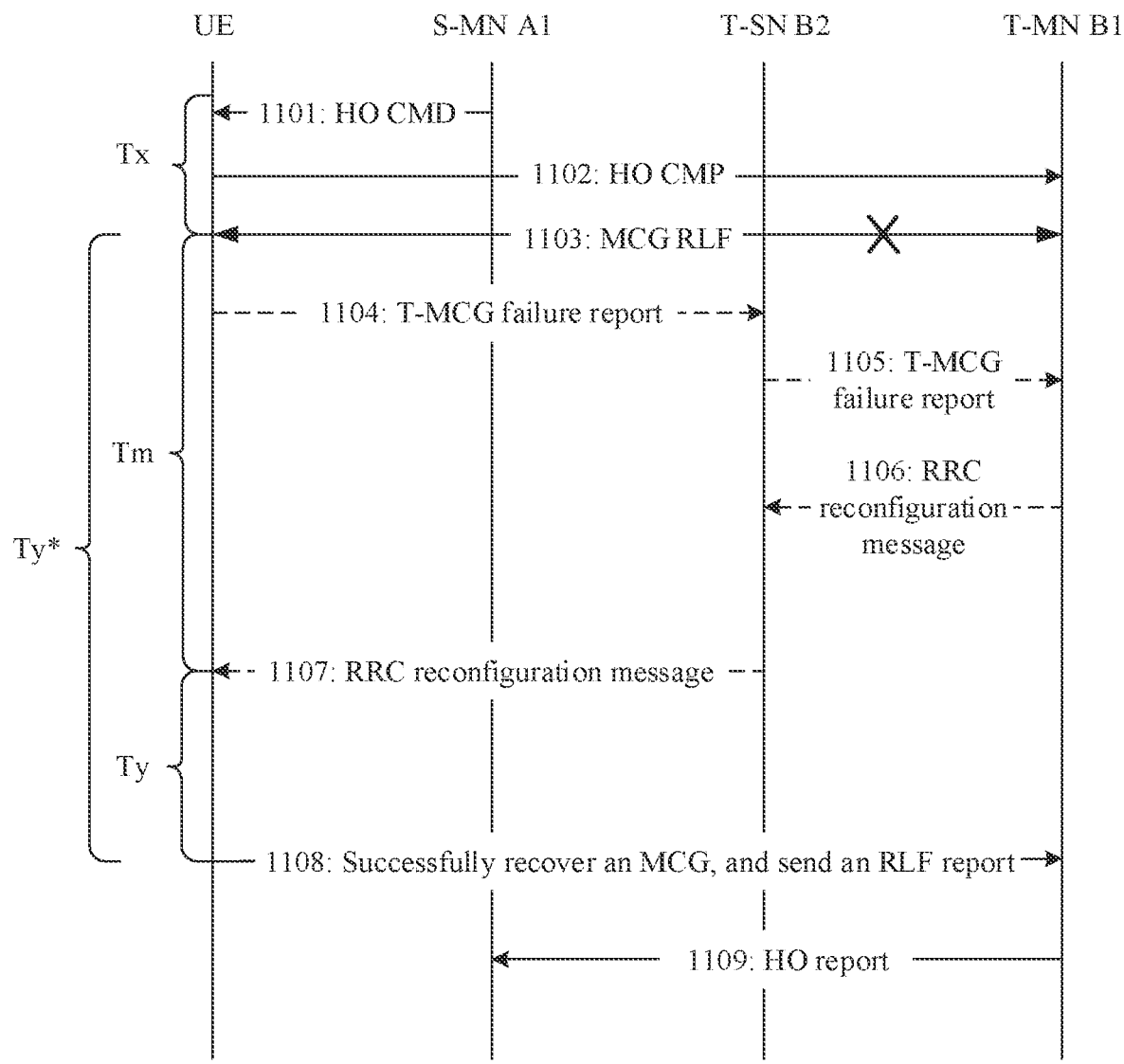
FIG. 11 is a schematic flowchart of another communication method according to an embodiment of this application.

FIG. 11 is a schematic flowchart of a communication method according to an embodiment of this application. In FIG. 11, UE is used as an example of the terminal device in FIG. 5, an access network device to which a T-MN B1 belongs is used as the first access network device in FIG. 5, the access network device to which the T-MN B1 belongs is the second access network device, and an access network device to which an S-MN A1 belongs is used as an example of the third access network device in FIG. 5 for description.

It should be noted that the first access network device and the second access network device in FIG. 11 are the same. That is, a cell in which a connection failure occurs is a same as a cell in which an RLF report is received. Therefore, a step of sending an RLF indication may not be required in the communication method in FIG. 11.

In an example, the UE in FIG. 11 is configured as DC on a target access network device side, and the communication method in FIG. 11 corresponds to a scenario of a too early HO.

1101: The UE receives an HO CMD in the S-MN A1.

1102: The UE completes a handover in the T-MN B1, and sends the HO CMP to the T-MN B1.

1103: An RLF occurs on the UE in an MCG of the T-MN B1 soon after 1102.

1104: The UE sends an MCG failure report to a T-SN B2.

1105: The T-SN B2 sends the MCG failure report to the T-MN B1.

Specifically, for 1101 to 1106, refer to descriptions in 901 to 905 in FIG. 9. For brevity, details are not described herein again.

In the scenario shown in FIG. 11, a handover command initially received by the UE is the too early HO. However, in an MCG recovery process, addition of the T-SN B2 is appropriate, and therefore, a recovery delay of the UE in the T-SN B2 compensates for premature sending of the handover command. That is, quality of the T-MN B1 is not good enough when the handover command is received, but the quality of the T-MN B1 improves when the UE receives a recovery response message in the T-SN B2 after the delay caused by fast recovery.

In an example, after the following steps 1106 to 1108, the UE successfully recovers an MCG in the T-MN B1.

1106: The T-MN B1 sends an RRC reconfiguration message to the T-SN B2.

1107: The T-SN B2 sends the RRC reconfiguration message to the UE.

1108: The UE successfully recovers the MCG in the T-MN B1. That is, the UE successfully recovers a connection between the UE and the MCG T-MN B1 by using the T-SN B2, and sends an RLF report.

To enable the S-MN A1 to appropriately adjust a handover parameter, the UE needs to record cell information experienced in a process from detecting the RLF (namely, the RLF in 1103) for the first time to attempting reestablishment and time information.

In an example, for the scenario in FIG. 11, information elements recorded by the UE are as follows.

(1) first failedCellId: B1.
(2) first connectionFailureType: the RLF.
(3) first previousCellId: A1.
(4) last failedCellId. not exist.
(5) last connectionFailureType: the RLF.
(6) last previousCellId: B2.
(7) connectionCellId: B1, a cell in which reestablishment is attempted.
(8) time to first ConnFailure: Tx, time since receiving the first HO command (namely, 1101) to a time point at which the connection failure occurs in the T-MN B1 (namely, 1103).
(9) time Since first connFailure to last HO CMD: Tm, time since a connection in the T-MN B1 fails (namely, 1103) to a time point at which the T-SN B2 receives a reconfiguration message (namely, 1107).
(10) time since last HO CMD to last connfailure: not exist.
(11) time since last HO CMD: Ty, time since receiving the last reconfiguration message (namely, 1107).

Alternatively, the foregoing information elements (9) to (11) may be replaced with the following information element (9)*.

(9)* time since first failure: Ty*, time since detecting that the connection failure (namely, 1103) occurs in the T-MN B1.

Specifically, for the information elements (1) to (11), refer to the descriptions in FIG. 6. For brevity, details are not described herein again.

For example, the UE sends the RLF report to the T-MN B1, where the RLF report includes the foregoing information elements recorded by the UE.

1109: After receiving the RLF report, the T-MN B1 determines, based on a historical handover record and the information element (3) first previousCellId: A1 in the RLF report, that an HO report needs to be sent to the S-MN A1.

The S-MN A1 may appropriately adjust the handover parameter based on the received HO report.

Figure 12:
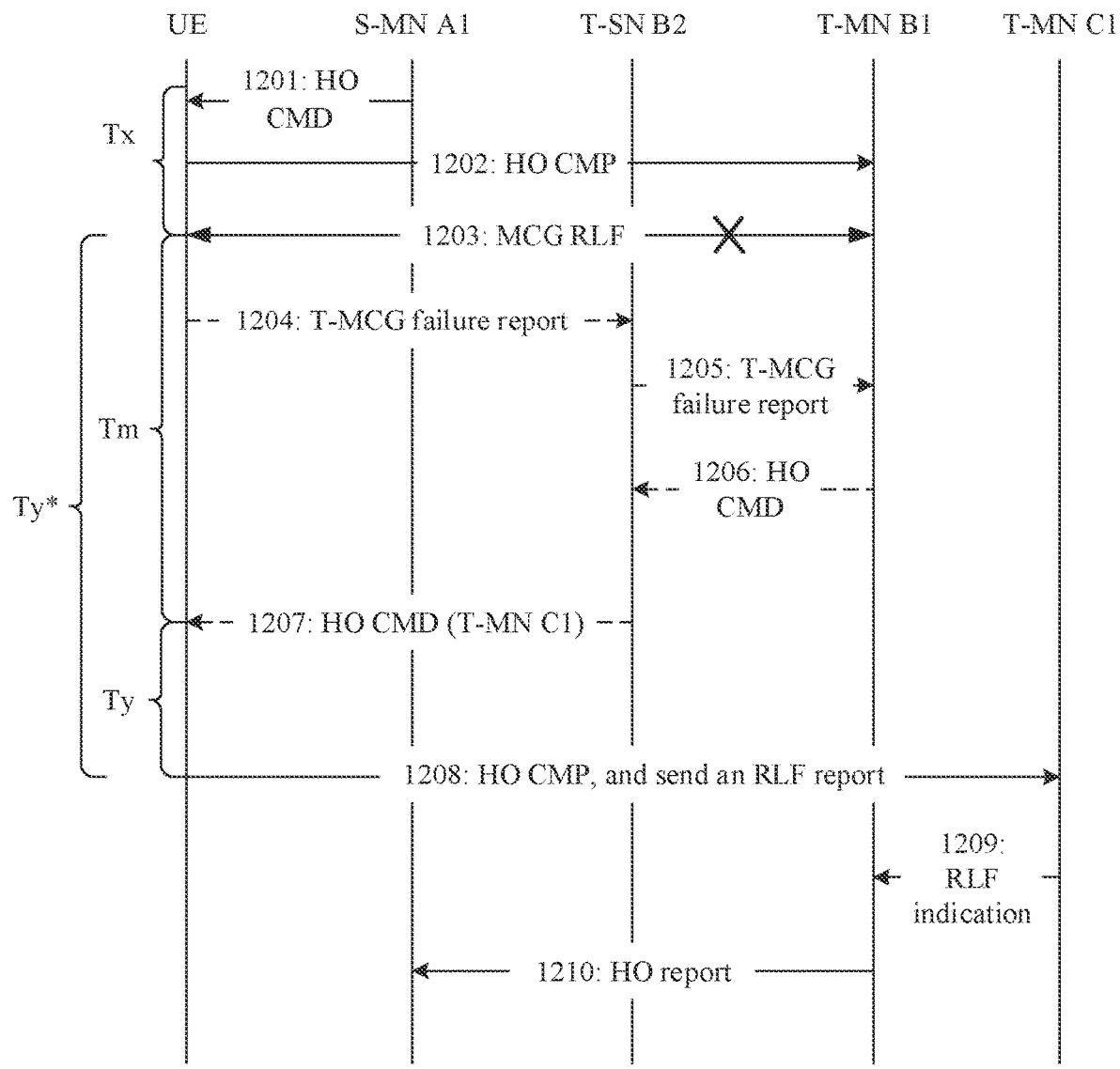
FIG. 12 is a schematic flowchart of another communication method according to an embodiment of this application.

FIG. 12 is a schematic flowchart of a communication method according to an embodiment of this application. In FIG. 12, UE is used as an example of the terminal device in FIG. 5, an access network device to which a T-MN C1 belongs is used as an example of the first access network device in FIG. 5, an access network device to which a T-MN B1 belongs is used as an example of the second access network device in FIG. 5, and an access network device to which an S-MN A1 belongs is used as an example of the third access network device in FIG. 5 for description.

In an example, the UE in FIG. 12 is configured as DC on a target access network device side, and the communication method in FIG. 12 corresponds to a scenario of an HO to wrong cell.

1201: The UE receives an HO CMD in the S-MN A1.

1202: The UE completes a handover in the T-MN B1, and sends the HO CMP to the T-MN B1.

1203: An RLF occurs on the UE in an MCG of the T-MN B1 soon after 1202.

1204: The UE sends an MCG failure report to a T-SN B2.

1205: The T-SN B2 sends the MCG failure report to the T-MN B1.

Specifically, for 1201 to 1206, refer to descriptions in 901 to 905 in FIG. 9. For brevity, details are not described herein again.

1206: The T-MN B1 sends an HO CMD to the T-SN B2.

1207: T-SN B2 sends the HO CMD to the UE, to indicate the UE to be handed over to T-MN C1. Correspondingly, the UE successfully receives the handover message from the T-SN B2.

In an MCG recovery process, because addition of the T-SN B2 is appropriate, the UE successfully receives a response message from the T-SN B2, that is, the UE may consider that the MCG successfully recovered, that is, the UE successfully recovers a connection between the UE and the MCG by using an SCG.

1208; The UE successfully performs a handover in the T-MN C1, sends an HO CMP to the T-MN C1, and sends an RLF report.

To enable the S-MN A1 to appropriately adjust a handover parameter, the UE needs to record cell information experienced in a process from detecting the RLF (namely, the RLF in 1203) for the first time to attempting reestablishment and time information.

In an example, for the scenario in FIG. 12, information elements recorded by the UE are as follows.

(1) first failedCellId: B1.
(2) first connectionFailureType; the RLF.
(3) first previousCellId: A1.
(4) last failedCellId: not exist.
(5) last connectionFailureType: not exist.
(6) last previousCellId: B2.
(7) connectionCellId: C1, a cell in which reestablishment is attempted.
(8) time to first ConnFailure: Tx, time since receiving the first HO command (namely, 1201) to a time point at which the connection failure occurs in the T-MN B1 (namely, 1203).
(9) time Since first connFailure to last HO CMD: Tm, time since a connection in the T-MN B1 fails (namely, 1203) to a time point at which the UE receives a handover command (namely, 1207).

(10) time since last HO CMD to last connfailure: not exist.

(11) time since last HO CMD: Ty, time since receiving the last handover command (namely, 1207).

Alternatively, the foregoing information elements (9) to (11) may be replaced with the following information element (9)*.

(9)* time since first failure: Ty*, time since detecting that the connection failure (namely, 1203) occurs in the T-MN B1.

Specifically, for the information elements (1) to (11), refer to the descriptions in FIG. 6. For brevity, details are not described herein again.

For example, the UE sends the RLF report to the T-MN C1, where the RLF report includes the foregoing information elements recorded by the UE.

1209: After receiving the RLF report, the T-MN C1 determines, based on the information element (1) first failedCellId: B1 in the RLF report, that an RLF indication needs to be sent to the T-MN B1, where the RLF indication carries the RLF report. For details of the RLF indication, refer to the foregoing description. Details are not described herein again.

1210: The T-MN B1 may further determine, based on the information element (3) first previousCellId: A1 in the RLF report, that an HO to wrong cell from the S-MN A1 to the T-MN B1 occurs. Alternatively, the T-MN B1 determines, based on the RLF report, that an error of a too early HO from the S-MN A1 to the T-MN B1 occurs. Then, the T-MN B1 sends an HO report to the S-MN A1. For details of the HO report, refer to the foregoing description. Details are not described herein again.

The S-MN A1 may appropriately adjust the handover parameter based on the received HO report.

Figure 13:
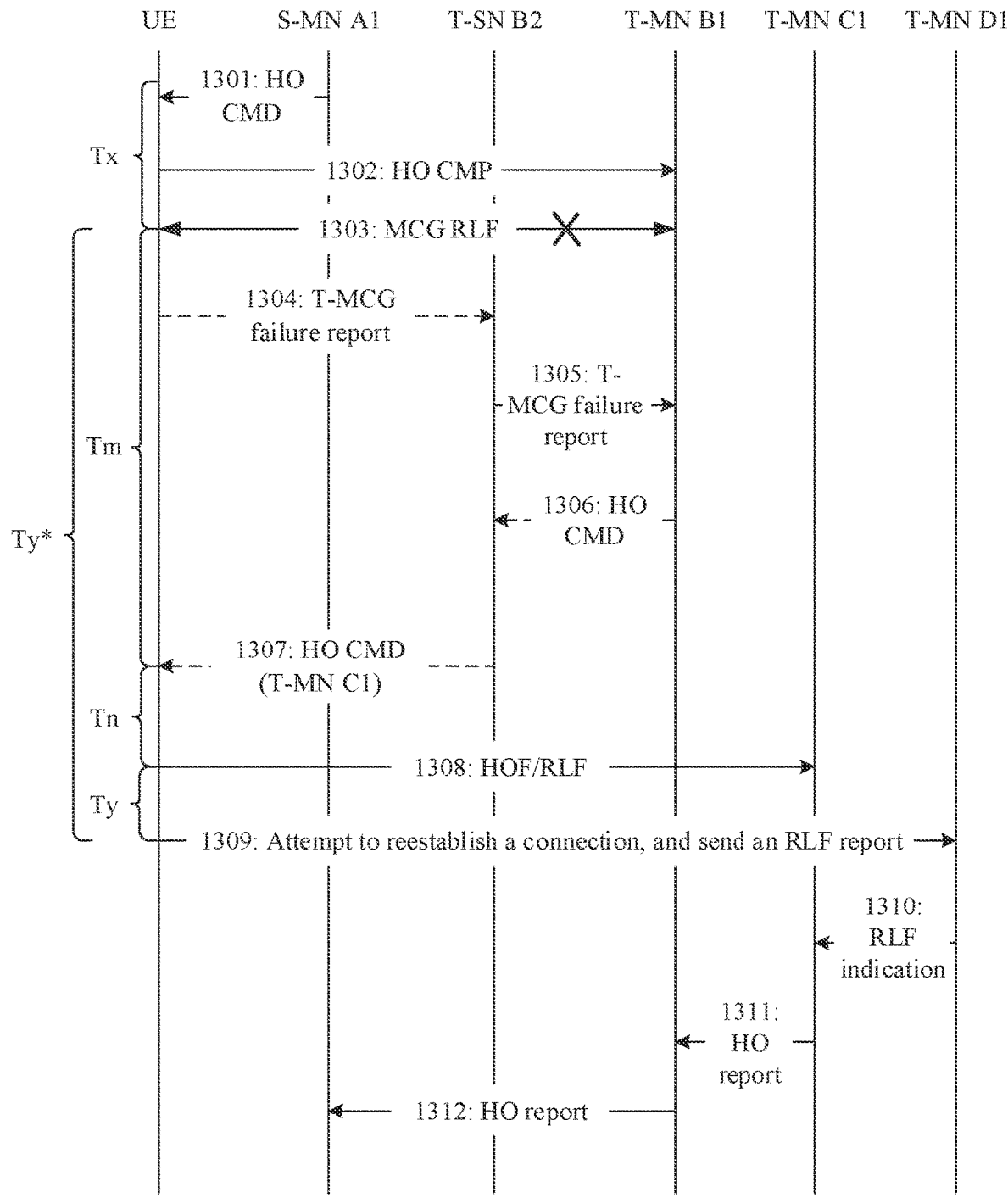
FIG. 13 is a schematic flowchart of another communication method according to an embodiment of this application.

FIG. 13 is a schematic flowchart of a communication method according to an embodiment of this application. In FIG. 13, UE is used as an example of the terminal device in FIG. 5, an access network device to which a T-MN D1 belongs is used as an example of the first access network device in FIG. 5, an access network device to which a T-MN C1 belongs is used as an example of the second access network device in FIG. 5, and an access network device to which a T-MN B1 belongs is used as an example of the third access network device in FIG. 5 for description.

Optionally, in FIG. 13, the third access network device may further send an HO report to a fourth access network device. In an example, the fourth access network device is, for example, an S-MN A1.

In an example, the UE in FIG. 13 is configured as DC on a target access network device side, and the communication method in FIG. 13 corresponds to scenarios of a too early HO (T-MN B1) or an HO to wrong cell (T-MN B1), and an HO to wrong cell (T-MN C1).

1301: The UE receives an HO CMD in the S-MN A1.

1302: The UE completes a handover in the T-MN B1, and sends the HO CMP to the T-MN B1.

1303: An RLF occurs on the UE in an MCG of the T-MN B1 soon after 1302.

1304: The UE sends an MCG failure report to a T-SN B2.

1305: The T-SN B2 sends the MCG failure report to the T-MN B1.

1306: The T-MN B1 sends an HO CMD to the T-SN B2.

1307: T-SN B2 sends the HO CMD to the UE, to indicate the UE to be handed over to T-MN C1.

Specifically, for 1301 to 1307, refer to descriptions in 1201 to 1207 in FIG. 12. For brevity, details are not described herein again.

1308: The UE does not complete a handover in the T-MN C1, and an HOF occurs; or although the UE completes the handover, the RLF occurs soon.

In an example, because the T-MN B1 incorrectly selects the T-MN C1 as a target cell, the UE selects a target primary cell D1 (denoted as T-MN D1) after the RLF and attempts reestablishment in the T-MN D1.

1309: The UE attempts to reestablish a connection in the T-MN D1, and sends an RLF report.

In an example, the UE successfully attempts reestablishment in the T-MN D1.

To enable the S-MN A1 to appropriately adjust a handover parameter, the UE needs to record cell information experienced in a process from detecting the RLF (namely, the RLF in 1303) for the first time to attempting reestablishment and time information.

In an example, for the scenarios in FIG. 13, information elements recorded by the UE are as follows.

(1) first failedCellId: B1.

(2) first connectionFailureType: the RLF.

(3) first previousCellId: A1.

(4) last failedCellId: C1.

(5) last connectionFailureType: the HOF/the RLF.

(6) last previousCellId: B2.

(7) connectionCellId: D1, a cell in which reestablishment is attempted.

(8) time to first ConnFailure: Tx, time since receiving the first HO command (namely, 1301) to a time point at which the connection failure occurs in the T-MN B1 (namely, 1303).

(9) time Since first connFailure to last HO CMD: Tm, time since a connection in the T-MN B1 fails (namely, 1303) to receiving a handover command (namely, 1307).

(10) time since last HO CMD to last connfailure: Tn; time since receiving the last handover command (namely, 1307) to a time point at which a connection fails in the T-MN C1 (namely, 1308).

(11) time since last connfailure: Ty, time since the T-MN C1 connection failure (namely, 1308).

Alternatively, the foregoing information elements (9) to (11) may be replaced with the following information element (9)*.

(9)* time since first failure: Ty*, time since detecting that the connection failure (namely, 1303) occurs in the T-MN BL.

Specifically, for the information elements (1) to (11), refer to the descriptions in FIG. 6. For brevity, details are not described herein again.

For example, the UE sends the RLF report to the T-MN D1, where the RLF report includes the foregoing information elements recorded by the UE.

1310: After receiving the RLF report, the T-MN D1 determines, based on the information element (4) last failedCellId: C1 in the RLF report, that an RLF indication needs to be sent to the T-MN C1, where the RLF indication carries the RLF report. For details of the RLF indication, refer to the foregoing description. Details are not described herein again.

1311: The T-MN C1 may further determine, based on the information elements (1) first failedCellId: B1 and (5) last connectionFailureType: HOF/RLF in the RLF report, that an error of an HO to wrong cell from the T-MN B1 to the T-MN C1 occurs, and then the T-MN C1 sends an HO report to the T-MN B1, where the HO report carries the RLF report. For details of the HO report, refer to the foregoing description. Details are not described herein again.

Similarly, 1312: The T-MN B1 determines, based on the RLF report in the HO report, that an error of an HO to wrong cell from the S-MN A1 to the T-MN B1 occurs; or the T-MN B1 determines, based on the RLF report in the HO report, that an error of a too early HO error from the S-MN A1 to the T-MN B1 occurs, and then the T-MN B1 sends the HO report to the S-MN A1.

The S-MN A1 may appropriately adjust the handover parameter based on the received HO report.

It should be understood that FIG. 6 to FIG. 13 show steps or operations of the communication methods provided in the embodiments of this application, but these steps or operations are merely examples. In the embodiments of this application, other operations or variations of the operations in the figures may be further performed. In addition, the steps in the figures may be performed in a sequence different from that presented in the figures, and it is possible that not all the operations in the figures need to be performed.

In an example, in the embodiments in FIG. 6 to FIG. 13, an example in which after the UE detects that the MCG connection failure, the UE may successfully send the MCG failure report in the corresponding SCG is used for description. Alternatively, the embodiments in FIG. 6 to FIG. 13 may also perform variations of the foregoing operations. For example, the UE detects the SCG RLF when the UE cannot send the MCG failure report in the SCG, or the UE directly detects the SCG RLF.

In another example, in the embodiments in FIG. 6 to FIG. 13, an example in which the MCG performs a handover procedure with a target MCG after receiving the MCG failure report sent by the SCG is used for description. Alternatively, in the embodiments in FIG. 6 to FIG. 13, the MCG may perform different sequences. For example, before the UE detects that the MCG connection failure, the MCG performs a handover procedure between the MCG and the target MCG.

In still another example, in the embodiments in FIG. 6 to FIG. 13, an example in which an RLF occurs soon after the UE completes a handover to the target MCG is used for description. Alternatively, the embodiments in FIG. 6 to FIG. 13 may alternatively include an operation that a connection failure occurs in a process of handover of the UE to the target MCG, that is, the HOF occurs when UE does not complete the handover to the target MCG.

It should be further understood that, in the descriptions in FIG. 6 to FIG. 13, that the UE sends the RLF report to a cell (for example, the S-MN A1, the T-MN B1, the T-MN C1, and the T-MN D1) means that the UE sends, by using the cell, the RLF report to a base station to which the cell belongs. Correspondingly, that the cell (for example, the S-MN A1, the T-MN B1, the T-MN C1, and the T-MN D1) receives the RLF report and processes the RLF report means that the base station to which the cell belongs receives the RLF report and processes the RLF report.

In addition, sending information (for example, an RLF indication or an HO report) between cells means sending the information between base stations to which the cell belongs.

It should be further noted that, in the embodiments of this application, the steps of attempting to reestablish a connection and sending an RLF report in FIG. 6, FIG. 7, FIG. 9, FIG. 10, and FIG. 13 may be implemented by using one piece of signaling, or implemented by using at least two pieces (including two or more pieces) of signaling; the steps of the handover command completion and sending the RLF report in FIG. 8 and FIG. 12 may be implemented by using one piece of signaling or implemented by using at least two pieces (including two or more pieces) of signaling; the steps of successfully recovering the MCG and sending the RLF in FIG. 11 may be implemented by using one piece of signaling, implemented by using at least two pieces (including two or more pieces) of signaling. This is not limited in the embodiments of this application.

Figure 14:
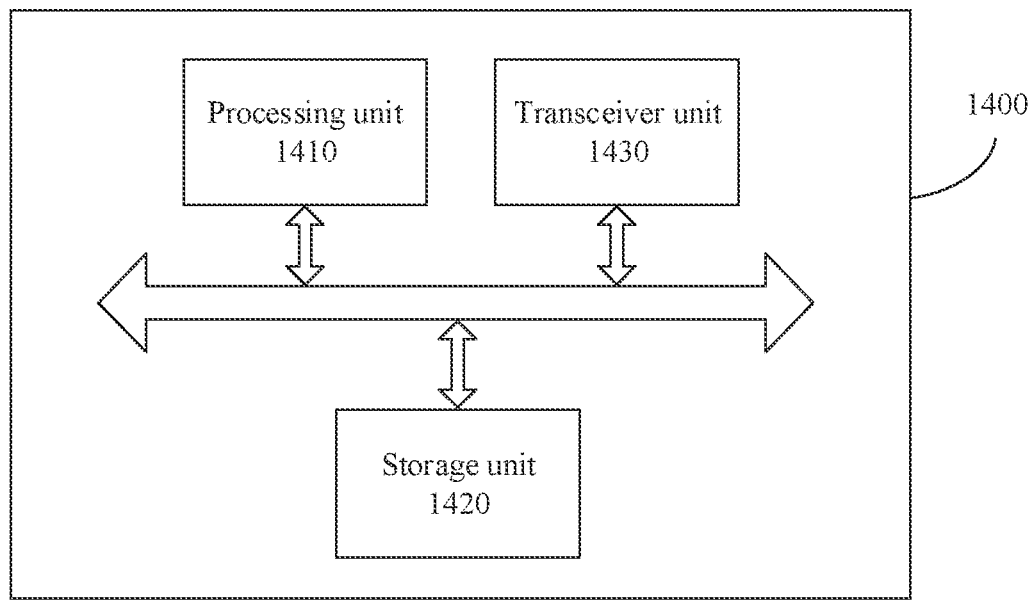
FIG. 14 is a schematic diagram of a wireless communication apparatus according to an embodiment of this application.

According to the foregoing method, FIG. 14 is a schematic diagram of a wireless communication apparatus 1400 according to an embodiment of this application.

The apparatus 1400 may be a terminal device, or may be a chip or a circuit, for example, a chip or a circuit that may be disposed in the terminal device. In a possible manner, the apparatus 1400 may include a processing unit 1410 (that is, an example of a processor) and a transceiver unit 1430.

Optionally, the transceiver unit 1430 may be implemented by using a transceiver, a transceiver-related circuit, or an interface circuit.

Optionally, the apparatus may further include a storage unit 1420. In a possible manner, the storage unit 1420 is configured to store instructions. Optionally, the storage unit may also be configured to store data or information. The storage unit 1420 may be implemented by using a memory.

In a possible design, the processing unit 1410 is configured to execute the instructions stored in the storage unit 1420, so that the apparatus 1400 implements the steps performed by the terminal device (for example, the UE) in the foregoing method. Alternatively, the processing unit 1410 may be configured to invoke the data in the storage unit 1420, so that the apparatus 1400 implements the steps performed by the terminal device (for example, the UE) in the foregoing method.

For example, the processing unit 1410, the storage unit 1420, and the transceiver unit 1430 may communicate with each other by using an internal connection path to transfer a control signal and/or a data signal. For example, the storage unit 1420 is configured to store a computer program, and the processing unit 1410 may be configured to invoke the computer program from the storage unit 1420 and run the computer program, to control the transceiver unit 1430 to receive a signal and/or send a signal, to complete the steps of the terminal device in the foregoing method. The storage unit 1420 may be integrated into the processing unit 1410, or may be disposed separately from the processing unit 1410.

Optionally, if the apparatus 1400 is a communication device (for example, the terminal device), the transceiver unit 1430 includes a receiver and a transmitter. The receiver and the transmitter may be a same physical entity or different physical entities. When the receiver and the transmitter are the same physical entity, the receiver and the transmitter may be collectively referred to as a transceiver.

Optionally, if the apparatus 1400 is the chip or the circuit, the transceiver unit 1430 includes an input interface and an output interface.

In an implementation, a function of the transceiver unit 1430 may be considered to be implemented by using a transceiver circuit or a transceiver-dedicated chip. It may be considered that the processing unit 1410 is implemented by using a dedicated processing chip, a processing circuit, a processing unit, or a general-purpose chip.

In another implementation, it may be considered that the communication device (for example, the terminal device) provided in this embodiment of this application is implemented by using a general-purpose computer. That is, program code for implementing functions of the processing unit 1410 and the transceiver unit 1430 is stored in the storage unit 1420, and the general-purpose processing unit implements the functions of the processing unit 1410 and the transceiver unit 1430 by executing the code in the storage unit 1420.

In an implementation, the processing unit 1410 is configured to determine a failure report, where the failure report includes information about a cell in a secondary cell group SCG in which master cell group MCG connection recovery is attempted when the terminal device detects that a connection failure occurs in an MCG.

The transceiver unit 1430 is configured to send the failure report to a first access network device.

When the apparatus 1400 is configured in or is the terminal device, the modules or the units in the apparatus 1400 may be configured to perform actions or processing processes performed by the terminal device in the foregoing method. To avoid repetition, detailed descriptions are omitted herein.

For concepts, explanations, detailed descriptions, and other steps of the apparatus 1400 that are related to the technical solutions provided in the embodiments of this application, refer to the descriptions of the content in the foregoing methods or other embodiments. Details are not described herein again.

Figure 15:
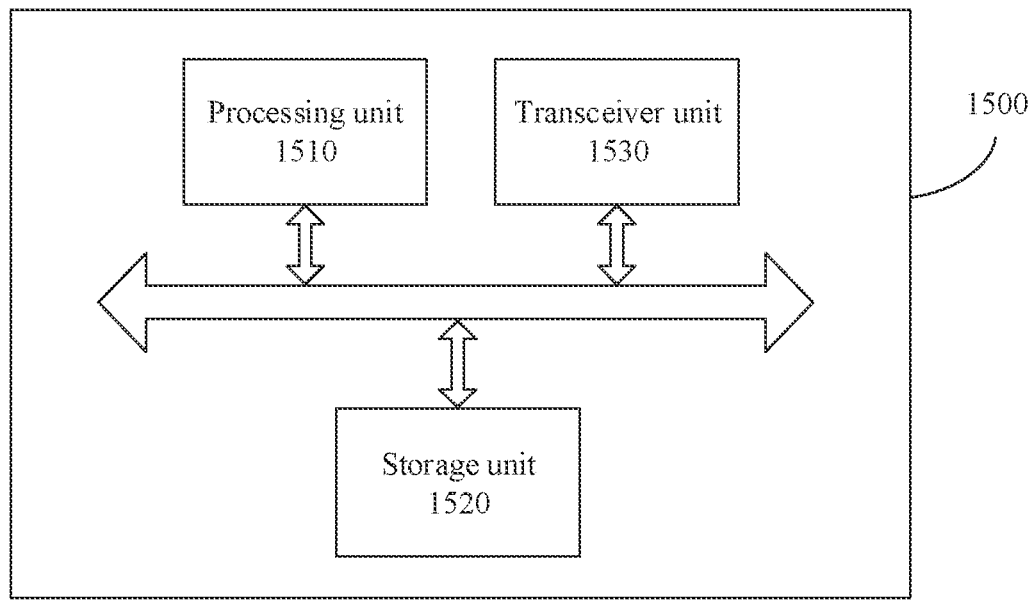
FIG. 15 is a schematic diagram of another wireless communication apparatus according to an embodiment of this application.

According to the foregoing method, FIG. 15 is a schematic diagram of a wireless communication apparatus 1500 according to an embodiment of this application.

The apparatus 1500 may be an access network device, or may be a chip or a circuit, for example, a chip or a circuit that may be disposed in the access network device. In a possible manner, the apparatus 1500 may include a processing unit 1510 (that is, an example of a processor) and a transceiver unit 1530.

Optionally, the transceiver unit 1530 may be implemented by using a transceiver, a transceiver-related circuit, or an interface circuit.

Optionally, the apparatus may further include a storage unit 1520. In a possible manner, the storage unit 1520 is configured to store instructions. Optionally, the storage unit may also be configured to store data or information. The storage unit 1520 may be implemented by using a memory.

In a possible design, the processing unit 1510 may be configured to execute the instruction stored in the storage unit 1520, so that the apparatus 1500 implements the steps performed by the first access network device, the second access network device, or the third access network device in the foregoing method. Alternatively, the processing unit 1510 may be configured to invoke data of the storage unit 1520, so that the apparatus 1500 implements the steps performed by the first access network device, the second access network device, or the third access network device in the foregoing method.

For example, the processing unit 1510, the storage unit 1520, and the transceiver unit 1530 may communicate with each other by using an internal connection path to transfer a control signal and/or a data signal. For example, the storage unit 1520 is configured to store a computer program, and the processing unit 1510 may be configured to invoke the computer program from the storage unit 1520 and run the computer program, to control the transceiver unit 1530 to receive a signal and/or send a signal, to complete the steps of the secondary node in the foregoing method. The storage unit 1520 may be integrated into the processing unit 1510, or may be disposed separately from the processing unit 1510.

Optionally, if the apparatus 1500 is a communication device, the transceiver unit 1530 may include a receiver and a transmitter. The receiver and the transmitter may be a same physical entity or different physical entities. When the receiver and the transmitter are the same physical entity, the receiver and the transmitter may be collectively referred to as a transceiver.

Optionally, if the apparatus 1500 is the chip or the circuit, the transceiver unit 1530 may include an input interface and an output interface.

In an implementation, a function of the transceiver unit 1530 may be considered to be implemented by using a transceiver circuit or a transceiver-dedicated chip. It may be considered that the processing unit 1510 is implemented by using a dedicated processing chip, a processing circuit, a processing unit, or a general-purpose chip.

In another implementation, it may be considered that a general-purpose computer is used to implement the communication device (for example, a first access network device, a second access network device, or a third access network device) provided in this embodiment of this application. That is, program code for implementing functions of the processing unit 1510 and the transceiver unit 1530 is stored in the storage unit 1520, and the general-purpose processing unit implements the functions of the processing unit 1510 and the transceiver unit 1530 by executing the code in the storage unit 1520.

In an implementation, when the apparatus 1500 is the first access network device, the transceiver unit 1530 is configured to receive a failure report sent by a terminal device, where the failure report includes information about a cell in a secondary cell group SCG in which master cell group MCG connection recovery is attempted when the terminal device detects that a connection failure occurs in an MCG.

The processing unit 1510 is configured to determine, based on the failure report, a cell in which the connection failure occurs.

Optionally, the transceiver unit 1530 is further configured to send a failure indication to a second access network device to which the cell in which the connection failure occurs belongs, where the failure indication includes the failure report.

In an implementation, when the apparatus 1500 is the second access network device, the transceiver unit 1530 is configured to receive a failure indication sent by a first access network device, where the failure indication includes a failure report, and the failure report includes information about a cell in a secondary cell group SCG in which master cell group MCG connection recovery is attempted when a terminal device detects that a connection failure occurs in an MCG.

The processing unit 1510 is configured to determine, based on the failure report, an access network device that causes the connection failure.

Optionally, the transceiver unit 1530 is further configured to send a first report to the third access network device that causes the connection failure, where the first report includes the failure report.

In an implementation, when the apparatus 1500 is the third access network device, the transceiver unit 1530 is configured to receive a first report sent by a second access network device, where the first report includes a failure report, and the failure report includes information about a cell in a secondary cell group SCG in which master cell group MCG connection recovery is attempted when a terminal device detects that a connection failure occurs in an MCG.

The processing unit 1510 is configured to adjust a mobility-related parameter based on the failure report.

The units in the foregoing embodiment may also be referred to as modules, circuits, or components.

Functions and actions of the modules or units in the apparatus 1500 enumerated above are merely examples for description. When the apparatus 1500 is configured in or is the first access network device, the modules or the units in the apparatus 1500 may be configured to perform the actions or processing processes performed by the first access network device in the foregoing method. When the apparatus 1500 is configured in or is the second access network device, the modules or the units in the apparatus 1500 may be configured to perform the actions or processing processes performed by the second access network device in the foregoing method. When the apparatus 1500 is configured in or is the third access network device, the modules or the units in the apparatus 1500 may be configured to perform the actions or processing processes performed by the third access network device in the foregoing method.

For concepts, explanations, detailed descriptions, and other steps of the apparatus 1500 that are related to the technical solutions provided in the embodiments of this application, refer to the descriptions of the content in the foregoing methods or other embodiments. Details are not described herein again.

Figure 16:
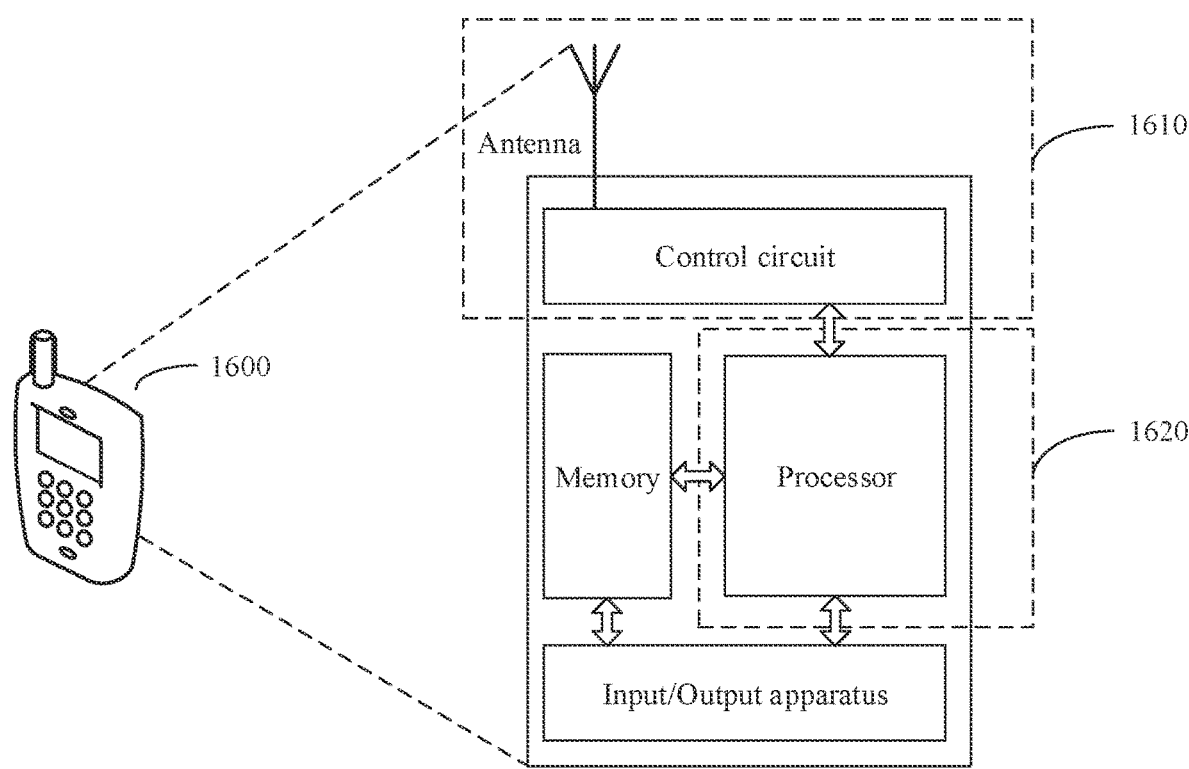
FIG. 16 is a schematic diagram of a structure of a terminal device according to an embodiment of this application.

FIG. 16 is a schematic diagram of a structure of a terminal device 1600 according to this application. The terminal device 1600 may perform the actions performed by the terminal device in the foregoing method embodiments.

For ease of description, FIG. 16 shows only main components of the terminal device. As shown in FIG. 16, the terminal device 1600 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiment. The memory is mainly configured to store the software program and the data, for example, store the content described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, such as a touchscreen, a display screen, or a keyboard, is mainly configured to: receive data input by a user, and output data to the user.

After the terminal device is powered on, the processor may read a software program in a storage unit, explain and execute instructions of the software program, and process data of the software program. When data needs to be sent wirelessly, the processor performs baseband processing on the to-be-sent data, and then outputs a baseband signal to the radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 16 shows only one memory and one processor. An actual terminal device may have a plurality of processors and a plurality of memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in this embodiment of this application, the antenna and the control circuit that have a transceiver function may be considered as a transceiver unit 1610 of the terminal device 1600, and the processor having a processing function may be considered as a processing unit 1620 of the terminal device 1600. As shown in FIG. 16, the terminal device 1600 includes the transceiver unit 1610 and the processing unit 1620. The transceiver unit may also be referred to as a transceiver, a transceiver apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. That is, the transceiver unit includes the receiving unit and the sending unit. For example, the receiving unit may also be referred to as a receiver, a receiver, a receiver circuit, or the like, and the sending unit may be referred to as a transmitter, a transmitter, a transmitting circuit, or the like.

Figure 17:
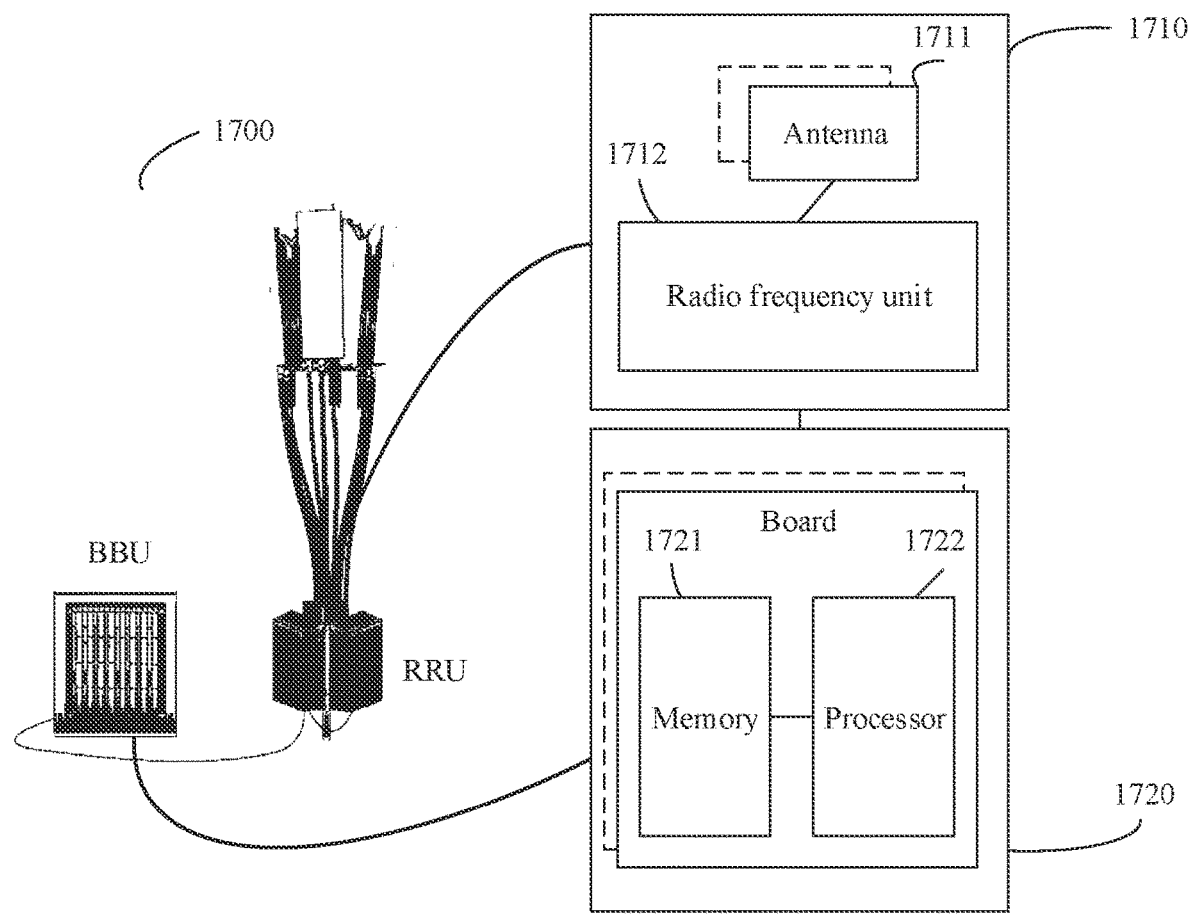
FIG. 17 is a schematic diagram of a structure of a network device according to an embodiment of this application.

FIG. 17 is a schematic diagram of a structure of a network device 1700 according to an embodiment of this application. The network device 1700 may be configured to implement a function of the access device (for example, the master node or the secondary node) in the foregoing methods. The network device 1700 includes one or more radio frequency units such as a remote radio unit (RRU) 1710 and one or more baseband units (BBU) (which may also be referred to as a digital unit, DU) 1720. The RRU 1710 may be referred to as a transceiver unit, a transceiver, a transceiver circuit, a transceiver, or the like, and may include at least one antenna 1711 and a radio frequency unit 1712. The RRU 1710 part is mainly configured to: send and receive a radio frequency signal and perform conversion between a radio frequency signal and a baseband signal, for example, is configured to send the signaling message in the foregoing embodiments to a terminal device. The BBU 1720 is mainly configured to perform baseband processing, control a base station, and so on. The RRU 1710 and the BBU 1720 may be physically disposed together, or may be physically separated, in other words, in a distributed base station.

The BBU 1720 is a control center of the base station, may also be referred to as a processing unit, and is mainly configured to implement a baseband processing function, for example, channel coding, multiplexing, modulation, and spreading. For example, the BBU (the processing unit) 1720 may be configured to control the base station 1700 to execute an operation procedure related to the network device in the foregoing method embodiments.

In an example, the BBU 1720 may include one or more boards, and a plurality of boards may jointly support a radio access network (such as an LTE system or a 5G system) in a single access standard, or may separately support radio access networks in different access standards. The BBU 1720 further includes a memory 1721 and a processor 1722. The memory 1721 is configured to store necessary instructions and data. For example, the memory 1721 stores the content and the like in the foregoing embodiments. The processor 1722 is configured to control the base station to perform a necessary action, for example, configured to control the base station to perform the operation procedure related to the network device in the foregoing method embodiments. The memory 1721 and the processor 1722 may serve one or more boards. In other words, a memory and a processor may be separately disposed on each board. Alternatively, a plurality of boards may share a same memory and a same processor. In addition, a necessary circuit may further be disposed on each board.

In a possible implementation, with development of a system-on-chip (SoC) technology, all or some functions of the part 1720 and the part 1710 may be implemented by using the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the network device shown in FIG. 17 is merely a possible form, and should not constitute any limitation on the embodiments of this application. In this application, there may be a base station structure in another form in the future.

According to the methods provided in the embodiments of this application, an embodiment of this application further provides a communication system, including the foregoing first access network device and the foregoing terminal device. Further, the communication system may further include the foregoing second access network device or the foregoing third access network device.

It should be understood that, the processor in the embodiments of this application may be a central processing unit (CPU). The processor may alternatively be another general purpose processor, a digital signal processor (DSP), an application specific integrated circuit (ASIC), a field programmable gate array (FPGA) or another programmable logical device, a discrete gate or transistor logical device, a discrete hardware component, or the like. The general purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, random access memories (RAM) in many forms may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions or computer programs. When the computer instructions or the computer programs are loaded and executed on the computer, the procedure or functions according to the embodiments of this application are all or partially generated The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium, where the computer-readable medium stores a computer program. When the computer program is executed by a computer, the steps performed by the terminal device or the steps performed by the access network device in any one of the foregoing embodiments are implemented.

An embodiment of this application further provides a computer program product. When the computer program product is executed by a computer, the steps performed by the terminal device or the steps performed by the access network device in any one of the foregoing embodiments are implemented.

An embodiment of this application further provides a system chip. The system chip includes a communication unit and a processing unit. The processing unit may be, for example, a processor. The communication unit may be, for example, an input/output interface, a pin, a circuit, or the like. The processing unit may execute computer instructions, so that a chip in the system chip performs the steps performed by the terminal device or the steps performed by the access network device provided in the embodiments of this application.

Optionally, the computer instructions are stored in a storage unit.

The embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, contain, and/or carry instructions and/or data.

It should be understood that in the foregoing embodiments, terms such as "first" and "second" are merely intended to distinguish between different objects, and should not constitute any limitation on this application. For example, terms such as "first" and "second" are intended to distinguish between different access network devices.

It should be further understood that "the protocol" in the embodiments of this application may be a standard protocol in the communication field, and for example, may include an LTE protocol, an NR protocol, and a related protocol applied to a future communication system. This is not limited in this application.

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. "At least one of A and B", similar to "A and/or B", describes an association relationship between associated objects and represents that three relationships may exist. For example, at least one of A and B may represent the following three cases: Only A exists, both A and B exist, and only B exists.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied to a terminal device, comprising:
  determining a failure report, wherein the failure report comprises information about a cell in a secondary cell group (SCG) in which master cell group (MCG) connection recovery is attempted when the terminal device detects that a connection failure occurs in an MCG, and wherein the failure report further comprises information indicating a time elapsed between a SCG failure and a MCG failure, wherein the time elapsed between the SCG failure and the MCG failure is a time since the connection failure occurs in the MCG to a time point at which the terminal device detects, after the connection failure occurs in the MCG, that a second connection failure occurs in the SCG; and sending the failure report to a first access network device.

2. The method according to claim 1, wherein:

the SCG is an SCG in which a connection failure occurs, and the connection failure in the SCG is detected by the terminal device after detecting that the connection failure occurs in the MCG; or the SCG is an SCG in which MCG connection recovery is successfully performed after the terminal device detects that the connection failure occurs in the MCG.

3. The method according to claim 1, wherein the failure report further comprises at least one of the following information:

information about a cell in the MCG;

a type of the connection failure occurring in the MCG; or information about a cell to which the terminal device attempts to connect after the connection failure occurs in the MCG.

4. The method according to claim 1, wherein the failure report further comprises at least one of the following information:

information about a cell in which the terminal device receives a handover command before the connection failure occurs in the MCG; or information about a cell in which a connection failure occurs, wherein the connection failure in the cell is detected by the terminal device again after the connection failure occurs in the MCG.

5. The method according to claim 1, wherein the failure report further comprises at least one of the following information:

time since receiving a handover command before the connection failure occurs in the MCG to a time point at which the connection failure occurs in the MCG;

time since the connection failure occurs in the MCG to a time point at which the terminal device receives a handover command message after the connection failure occurs in the MCG;

time since the terminal device receives the handover command message after the connection failure occurs in the MCG to the time point at which the terminal device detects one more connection failure after the connection failure occurs in the MCG;

time since the terminal device detects the one more connection failure after the connection failure occurs in the MCG; or time since the terminal device receives the handover command message after the connection failure occurs in the MCG.

6. A communication method, comprising:

receiving, by a first access network device, a failure report sent by a terminal device, wherein the failure report comprises information about a cell in a secondary cell group (SCG) in which master cell group (MCG) connection recovery is attempted when the terminal device detects that a connection failure occurs in an MCG, and wherein the failure report further comprises information indicating a time elapsed between a SCG failure and a MCG failure, wherein the time elapsed between the SCG failure and the MCG failure is a time since the connection failure occurs in the MCG to a time point at which the terminal device detects, after the connection failure occurs in the MCG, that a second connection failure occurs in the SCG; and determining, by the first access network device based on the failure report, a cell in which the connection failure occurs.

7. The method according to claim 6, wherein the method further comprises:

sending, by the first access network device, a failure indication to a second access network device to which the cell in which the connection failure occurs belongs, wherein the failure indication comprises the failure report.

8. The method according to claim 6, wherein:

the SCG is an SCG in which a connection failure occurs, and the connection failure in the SCG is detected by the terminal device after detecting that the connection failure occurs in the MCG; or the SCG is an SCG in which MCG connection recovery is successfully performed after the terminal device detects that the connection failure occurs in the MCG.

9. The method according to claim 6, wherein the failure report further comprises at least one of the following information:

information about a cell in the MCG;

a type of the connection failure occurring in the MCG; or information about a cell to which the terminal device attempts to connect after the connection failure occurs in the MCG.

10. The method according to claim 6, wherein the failure report further comprises at least one of the following information:

information about a cell in which the terminal device receives a handover command before the connection failure occurs in the MCG; or information about a cell in which a connection failure occurs, wherein the connection failure is detected by the terminal device again after the connection failure occurs in the MCG.

11. The method according to claim 6, wherein the failure report further comprises at least one of the following information:

time since receiving a handover command before the connection failure occurs in the MCG to a time point at which the connection failure occurs in the MCG;

time since the connection failure occurs in the MCG to a time point at which the terminal device receives a handover command message after the connection failure occurs in the MCG;

time since the terminal device receives the handover command message after the connection failure occurs in the MCG to the time point at which the terminal device detects one more connection failure after the connection failure occurs in the MCG;

time since the terminal device detects the one more connection failure after the connection failure occurs in the MCG; or time since the terminal device receives the handover command message after the connection failure occurs in the MCG.

12. A communication apparatus, comprising:

one or more processors; and a non-transitory computer readable medium storing a program to be executed by the one or more processors, wherein the program comprises instructions that when executed by the one or more processors, cause the communication apparatus to perform operations comprising:

determining a failure report, wherein the failure report comprises information about a cell in a secondary cell group (SCG) in which master cell group (MCG) connection recovery is attempted when the communication apparatus detects that a connection failure occurs in an MCG, and wherein the failure report further comprises information indicating a time elapsed between a SCG failure and a MCG failure, wherein the time elapsed between the SCG failure and the MCG failure is a time since the connection failure occurs in the MCG to a time point at which the terminal device detects, after the connection failure occurs in the MCG, that a second connection failure occurs in the SCG; and sending the failure report to a first access network device.

13. The communication apparatus according to claim 12, wherein:
   the SCG is an SCG in which a connection failure occurs, and the connection failure in the SCG is detected by the communication apparatus after detecting that the connection failure occurs in the MCG; or
   the SCG is an SCG in which MCG connection recovery is successfully performed after the communication apparatus detects that the connection failure occurs in the MCG.

14. The communication apparatus according to claim 12, wherein the failure report further comprises at least one of the following information:
   information about a cell in the MCG;
   a type of the connection failure occurring in the MCG; or
   information about a cell to which the communication apparatus attempts to connect after the connection failure occurs in the MCG.

15. The communication apparatus according to claim 12, wherein the failure report further comprises at least one of the following information:
   information about a cell in which the communication apparatus receives a handover command before the connection failure occurs in the MCG; or
   information about a cell in which a connection failure occurs, wherein the connection failure in the cell is detected by the communication apparatus again after the connection failure occurs in the MCG.

16. The communication apparatus according to claim 12, wherein the failure report further comprises at least one of the following information:
   time since receiving a handover command before the connection failure occurs in the MCG to a time point at which the connection failure occurs in the MCG;
   time since the connection failure occurs in the MCG to a time point at which the communication apparatus receives a handover command message after the connection failure occurs in the MCG;
   time since the communication apparatus receives the handover command message after the connection failure occurs in the MCG to the time point at which the communication apparatus detects one more connection failure after the connection failure occurs in the MCG;
   time since the communication apparatus detects the one more connection failure after the connection failure occurs in the MCG; or
   time since the communication apparatus receives the handover command message after the connection failure occurs in the MCG.

* * * * *